United States Patent [19]

Walsh

[11] 3,898,373

[45] Aug. 5, 1975

[54] DATA COMMUNICATION SYSTEM

[76] Inventor: Leo F. Walsh, 4130 Split Rock Rd., Camillus, N.Y. 13031

[22] Filed: Nov. 12, 1973

[21] Appl. No.: 414,785

Related U.S. Application Data

[63] Continuation of Ser. No. 179,111, Sept. 9, 1971, abandoned.

[52] U.S. Cl. ....... 178/2 C; 178/69.5 R; 179/15 AL; 250/199; 340/172.5

[51] Int. Cl. ............ H04q 5/00

[58] Field of Search ............ 340/172.5, 147 R, 155, 340/150, 151, 152, 163; 179/15 AL; 178/69.5 R, 2 R, 2 C, 2 D, 2 E, 3, 4.1 R; 250/199

[56] References Cited

UNITED STATES PATENTS

| | | | |
|---|---|---|---|
| 2,406,165 | 8/1946 | Schroeder | 179/15 AL |
| 2,541,348 | 2/1951 | Espenschied | 179/15 AL |
| 2,626,987 | 1/1953 | Veaux | 179/15 AL |
| 3,245,043 | 4/1966 | Gaffney, Jr. et al. | 340/172.5 |
| 3,395,391 | 7/1968 | Gorog et al. | 340/172.5 |
| 3,408,632 | 10/1968 | Hauck | 340/172.5 |
| 3,411,143 | 11/1968 | Beausoleil et al. | 340/172.5 |
| 3,488,440 | 1/1970 | Logan et al. | 178/69.5 R |
| 3,500,328 | 3/1970 | Wallis | 340/172.5 |
| 3,504,182 | 3/1970 | Pizzurro et al. | 250/199 |
| 3,510,841 | 5/1970 | Lejon | 340/151 |
| 3,535,017 | 10/1970 | Miller | 250/199 |
| 3,571,794 | 3/1971 | Tong | 178/69.5 R |
| 3,575,602 | 4/1971 | Townes et al. | 250/199 |
| 3,593,290 | 7/1971 | Kerr | 340/147 R |
| 3,597,549 | 8/1971 | Farmer et al. | 179/15 AL |
| 3,597,733 | 8/1971 | Foxwell | 340/152 |
| 3,644,894 | 2/1972 | McCrea | 340/163 |
| 3,647,976 | 3/1972 | Moses | 179/15 AL |
| 3,651,474 | 3/1972 | Liberman | 340/172.5 |
| 3,729,586 | 4/1973 | Chow | 178/69.5 R |

FOREIGN PATENTS OR APPLICATIONS

| | | | |
|---|---|---|---|
| 985,267 | 12/1963 | United Kingdom | 179/15 AL |

*Primary Examiner*—Thomas A. Robinson
*Attorney, Agent, or Firm*—Oblon, Fisher, Spivak, McClelland & Maier

[57] ABSTRACT

A data communication system is disclosed which is particularly suited for "in-house" or localized on-line data transactions. The system includes a central communication processing unit, such as a digital computer, coupled to a plurality of remotely located units through a single, wide bandwidth, bidirectional communication line, such as a coaxial cable. The system includes interface logic for coupling a large number of remote units to the communication line in a "daisy chain" configuration, thereby permitting all remote units to have simultaneous access to the single communication line. An addressing scheme is provided to allow selective data transactions to be carried between the central communication processing unit and individual remote units.

43 Claims, 10 Drawing Figures

INVENTOR
LEO F. WALSH
BY Oblon, Fisher & Spivak
ATTORNEYS

BIT FORMAT

TRANSACTION DETECTOR

INPUT CIRCUIT

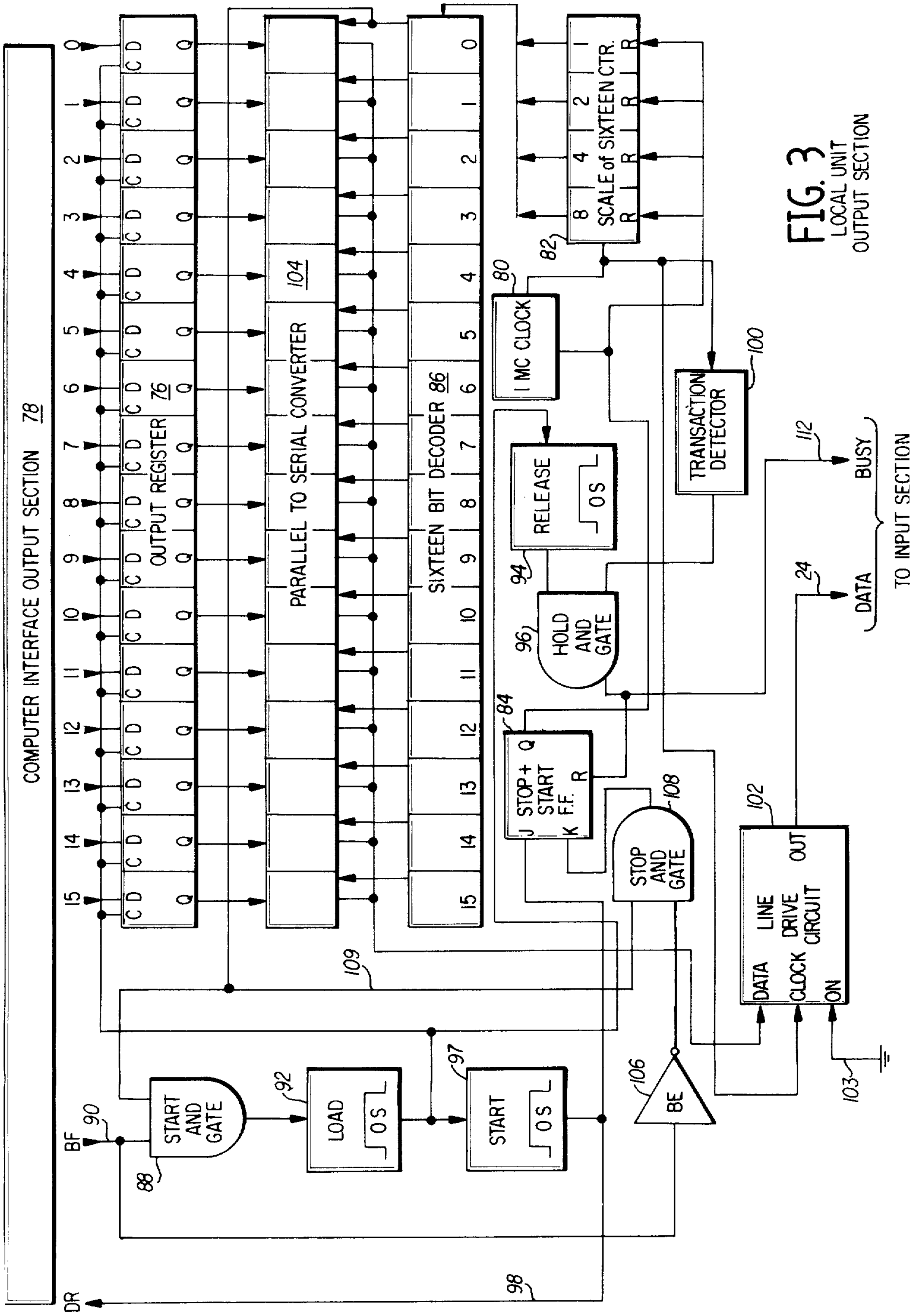
FIG. 3 LOCAL UNIT OUTPUT SECTION

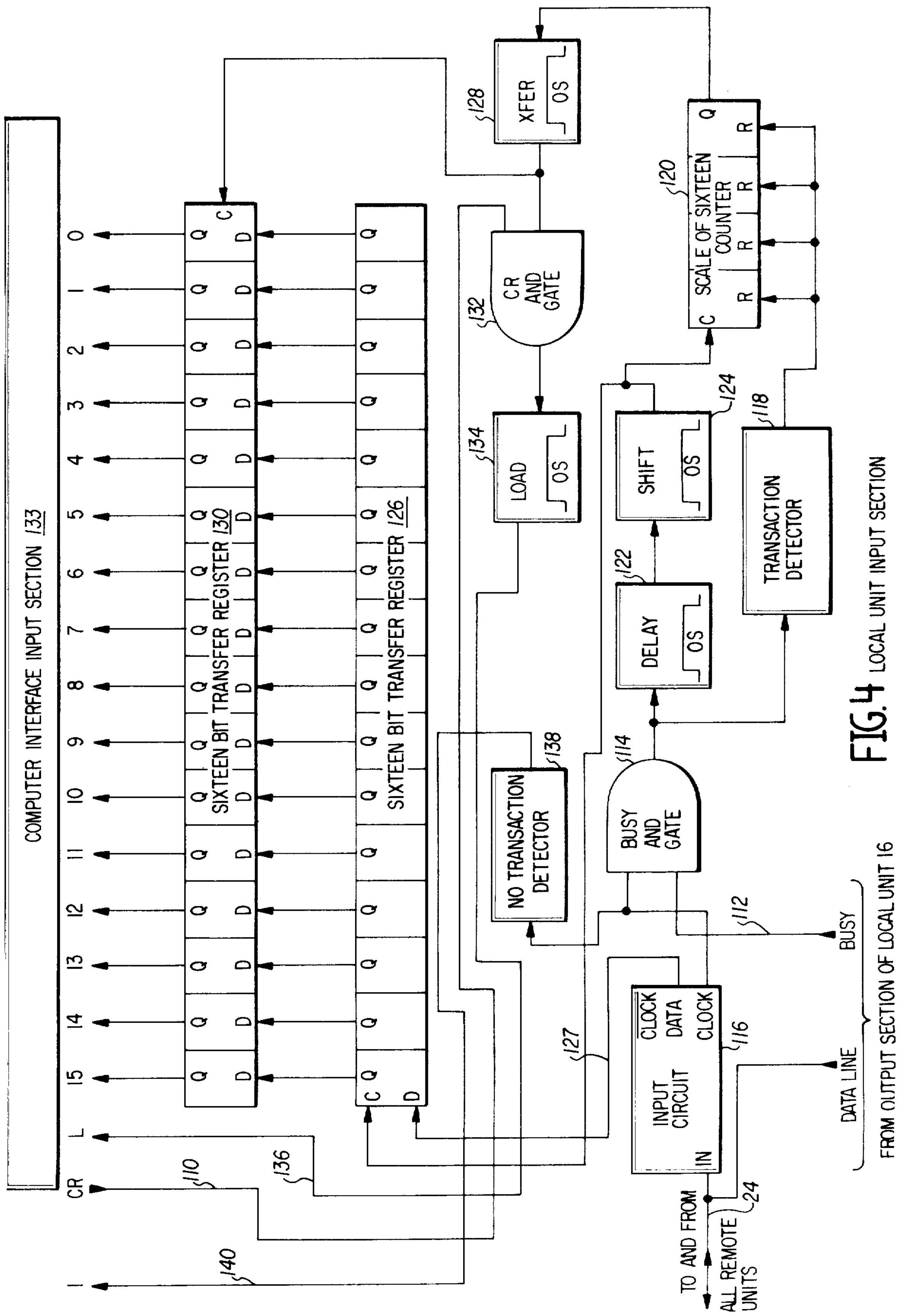
FIG. 4 LOCAL UNIT INPUT SECTION

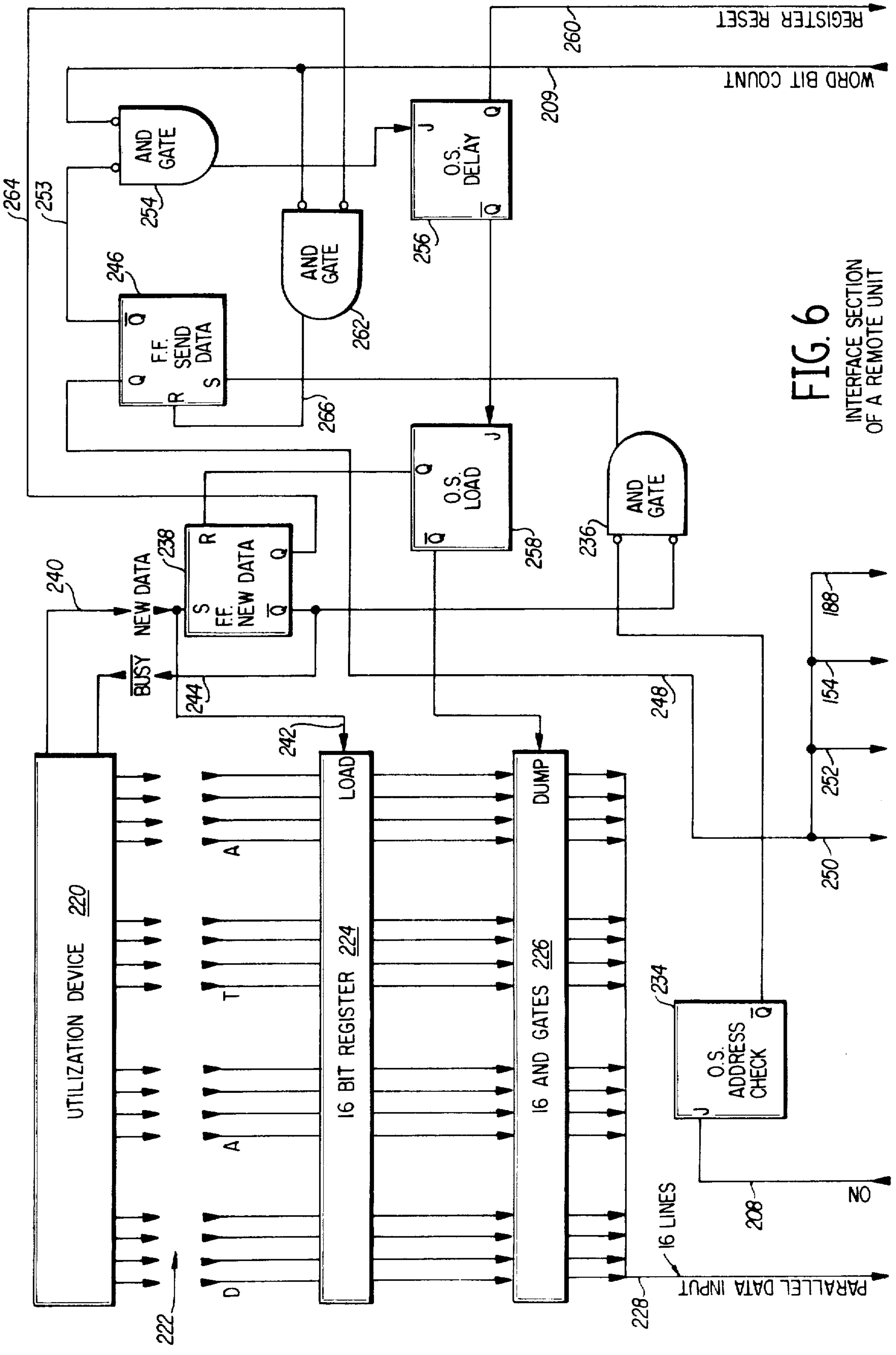
FIG. 6 INTERFACE SECTION OF A REMOTE UNIT

OUTPUT CIRCUIT

DATA COMMUNICATION SYSTEM

This is a continuation of application Ser. No. 179,111, filed Sept. 9, 1971, and now abandoned.

BACKGROUND OF THE INVENTION

1. Field Of The Invention

This invention relates generally to data communication systems, and more particularly to an "in-house" data communication system including a plurality of peripheral input-output devices coupled through a single communication link to a central control unit.

2. Description Of The Prior Art

The advent of computers has created a revolution in data handling. Computers make possible the handling and analysis of tremendous quantities of data in extremely short periods of time. Even the relatively small capacity computers now in existence are capable of handling and processing data at such speeds that the chief pratical problem created by their development is that of transmitting data to and from the computers at a rate which is compatible with their data processing speeds.

Thus, whether or not a computer system is used efficiently may depend almost entirely upon the techniques and equipment used to deliver raw data to and receive output responses from the computer.

The efficient use of computer systems is very important economically, since it can mean the difference between a burdensome expense for maintaning costly equipment which is operating below capacity, and a tremendous cost saving resulting from an improved capability for handling, processing and storing important data rapidly and conveniently.

Unfortunately, the use of data processing equipment in many institutions has been far from efficient in the past, due to a lack of adequate data communication facilities. For example, it is customary in many plant or manufacturing facilities to have a localized data processing facility which may constitute essentially a room in which a computer and a number of input-output devices are installed. Accounting and manufacturing data, as well as mathematical problems to be analyzed are customarily transported to the computer facility, punched into cards or tape in a suitable code, and then fed into the computer for processing. Similarly, the computer outputs may be in the form of punched cards or tapes or typewritten symbols. These outputs or responses must then be transported back to the accounting department or to the manufacturing machinery, and some physical manipulation must then be undertaken to transform them into practical results or physical outputs.

This type of approach to data processing is exremely inefficient, since it requires that the information to be analyzed must first be translated into a special code, then transferred to a special medium, such as punched cards or tpe, and finally processed on the computer. Clearly, it would be much more efficient to take data directly from a source such as an automatic machine tool, oscilloscope, or a cash register and transmit it directly to a computer facility for processing, without the intermediate coding steps. Similarly, it would be much more efficient to transmit responses directly from a computer to a utilization device, which could then act on them immediately, rather than to transport computer responses back to a utilization device, then manually adjust the device in accordance with the computer output. However, adequate data communication systems and interface equipment for quickly and inexpensively connecting data producing machines to a computer facility have not been available in the past.

In the past, efforts have been made to link data producing equipment and computer facilities together by means of communication links such as commercially available telephone lines or various forms of radio links. However, such systems are expensive, and are inefficient except when used over long distances. Thus, they are highly impractical for "in-house" or localized uses.

Smaller data communication systems have been designed for "in-house" use for certain specialized purposes. Generally, these systems have been extremely cumbersome, requiring numerous individual wire links for connecting date handling input-output devices with computing equipment. Normally, these systems are rather inflexible, and require each added data producing device to be individually wired or specially coupled into the system. They do not permit additional pieces of equipment to be merely plugged into an existing, prefabricated data communication system or line. In addition, they often require the use of expensive large capacity buffer memories and the like, due to the relatively slow rate at which data may be transmitted over their interconnecting networks to the computing facility. Furthermore, complicated multiplexing equipment is often required to make such systems operable.

Other similar systems have been developed recently having a somewhat improved flexibility. However, even these systems require the use of communication links having separate data receiving and transmitting lines, and lack interface logic which is sufficiently sophisticated to allow the use of a single, bidirectional communication line. In addition, these systems have been limited to use with a single type of input-output device, such as a CRT, for example.

Consequently, such existing "in-house" or localized data communication systems are inefficient for handlng real time data transactions, so necessary in modern institutional facilities, such as hospitals, factories, retail and other business installations, and the like.

SUMMARY OF THE INVENTION

Accordingly, one object of this invention is to provide a novel data communication and interconnection system.

Another object of this invention is to provide a data communication network suitable for providing real time analysis of input data.

Yet another object of this invention is to provide a low cost, highly flexible in-house date communication network.

Still another object of this invention is to provide a data communication network including a high-speed, bidirectional, wide band-width data communication line for coupling a plurality of remote units with a central processing unit.

A still further object of this invention is to provide a data handling network adapted to be built into institutional facilities.

Yet another object of this invention is to provide a data handling system which is inexpensive to install and highly flexible in its use.

A still further object of this invention is to provide a high-speed data processing system in which a plurality ›f remote units communicate with a central unit over ı single communication channel.

Another object of this invention is to provide a data :ommunication network capable of simultaneously ıandling a plurality of different types of data generated vithin an institutional facility.

Briefly, these and other objects of the invention are ıchieved by providing a cental communication pro-:essing unit, such as a digital computer, coupled hrough a single, wide bandwidth, bidirectional com-nunication link, such as a coaxial cable, with a plural-ty of remote units. Interfacng equipment is provided to ›ermit a large number of remote units to be coupled in "daisy-chain" configuration to the single communica-ion-link, so that all remote unis have simultaneous ac-ess to the single communication link. Logic circuitry, ncluding an addressing system, is provided to allow se-ective data transactions between the central communi-ation processing unit and particular remote units.

BRIEF DESCRIPTION OF THE DRAWINGS

A more complete appreciation of the invention and ıany of the attendant advantages thereof will be eadily appreciated as the same becomes better under-tood by reference to the following detailed description hen considered in connection with the accompanying )rawings, wherein:

FIG. 3 is a detailed block and logic diagram of the utput section of the local unit illustrated generally in IG. 1;

FIG. 4 is a detailed block and logic diagram of the ıput section of the local unit illustrated generally in IG. 1;

FIG. 6 is a detailed block and logic diagram of an in-rface section of one of the remote units illustrated enerally in FIG. 1;

DESCRIPTION OF THE PREFERRED EMBODIMENT

Figure 1:
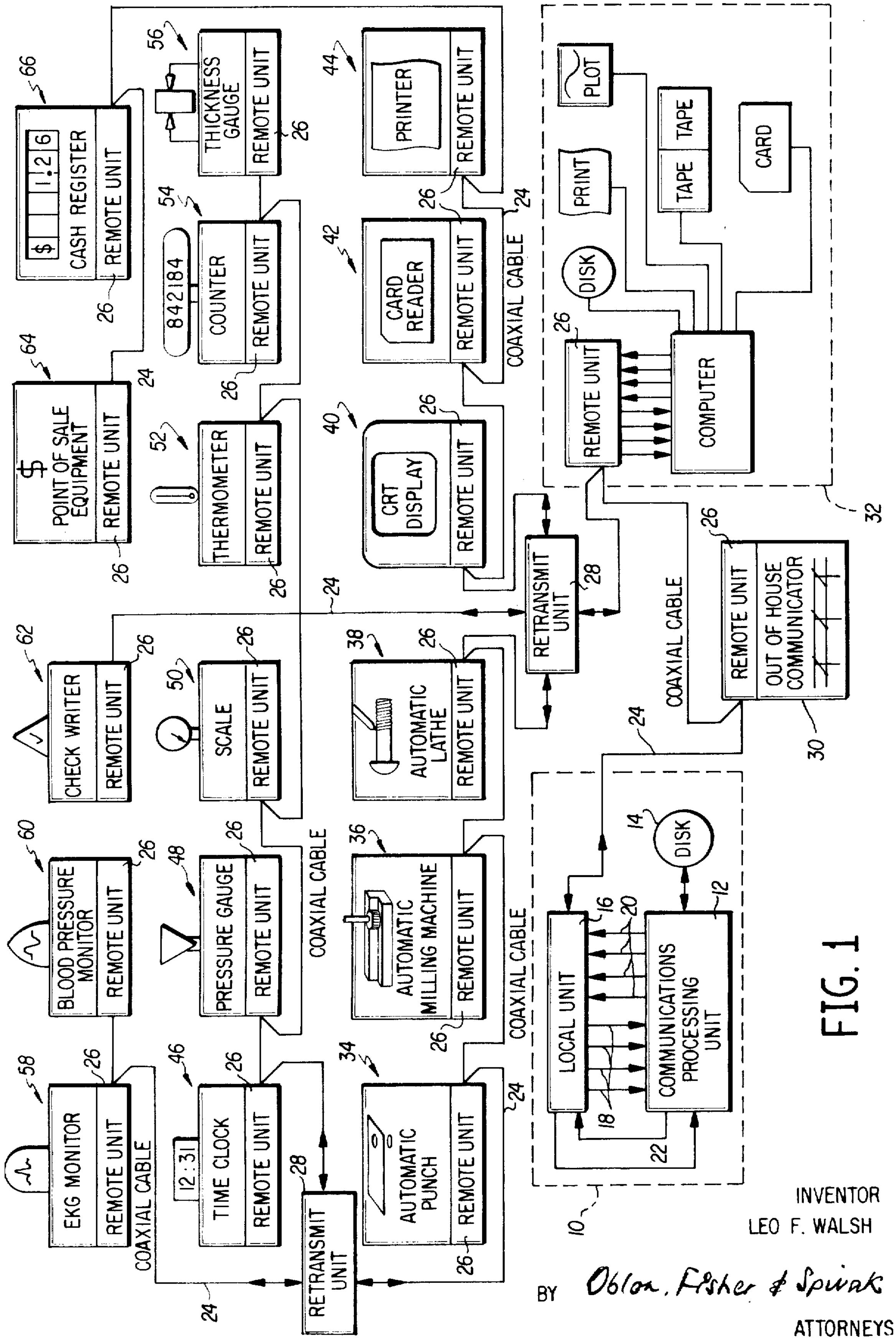
FIG. 1 is a block diagram illustrating the general con-guration of the data communication system of the resent invention, and showing a plurality of different ypes of exemplary inpput-output devices which may e utilized with the system.

Referring now to the drawing, wherein like reference ımerals designate identical or corresponding parts roughout the several views, and more particularly to G. 1 thereof, the general configuration of the data ›mmunication system of the present invention is illus-ated in the form of a block diagram. The system includes a central station 10 containing a communications processing unit 12. The communications processing unit (CPU) 12 may take many forms, but it is preferably a programmable digital computer of medium or small size, although the system imposes no limitations on the size, type or style of the computer used. Any type of peripheral equipment may be coupled to the computer, although only a disc memory 14 is illustrated coupled to the CPU 12 in FIG. 1. A local unit 16, which includes interface equipment for coupling the CPU 12 to the remainder of the system, is coupled in parallel configuration to the CPU 12 by means of a plurality of input lines 18 and a plurality of output lines 20. A plurality of control lines 22 are also coupled between the CPU 12 and the local unit 16 to permit operation of the local unit under the control of the CPU. Although only four input lines 18 and four output lines 20 are illustrated in FIG. 1, any number may be used depending upon the data word length selected for use with the system. For example, it has been found that a sixteen bit word length is appropriate for many applications of the system. If a sixteen bit word length is used, 16 input lines 18, 16 output lines 20, and four control lines 22 would be used, for example.

The local unit 16 is coupled to the remainder of the system by a single, wide bandwidth, bidirectional communication link or line 24, which is preferably a coaxial cable. Coaxial cable provides an ideal communication link since it is inexpensive, and appropriate coupling fixtures are commercially available. In addition, coaxial cable has no external field and is no susceptible to external fields from other sources, and thus may be used to provide an interference-free communication line even in an electromagnetically "noisy" environment. However, the system does not require that coaxial cable be used. Other types of communication links such as laser beams, high frequency waveguides, and similar devices may altenatively be used.

A wide bandwidth communication line, such as coaxial cable, is desirable since it permits very high data transmission rates to be achieved, and thereby make real time communications practical. For example, while narrow bandwidth lines, such as conventional telephone lines are limited to transmission rates on the order of only several thousand bits per second, wide bandwidth lines, such as coaxial cable, are capable of transmission rates on the order of one million bits per scond. Such high transmission rates are compatible with the data processing speeds of modern computers, and thus are highly efficient when used in transferring data into and out of computer systems.

The communication line 24 connects a plurality of remote units 26 in a looped or "daisy chain" configuration. This interconnection configuration allows a length of communication line to interconnect a plurality of remote units 26 while the communication line remains unbroken, and is able to supply data signals to all remote units nearly simultaneously. It should be understood that while the communication line 24 can remain unbroken for several thousand feet, at various portions along its length, it may be interrupted by branch repeater or retransmit unit 28, which amplifies data signals, and also permits the single communication line 24 to be branched, thus forming a plurality of interconnected "daisy chains." However, each "daisy chain" still includes only a single, bidirectional, wide bandwith communication line.

The "daisy chain" interconnection configuraton makes the system extremely flexible in that it permits remote stations to be added to or subtracted from the overall system with ease, without the need for completely rewiring, or in any way altering the basic interconnection system. Accordingly, the data communication system of the present invention is particularly well adapted for use in "in-house" or equivalent types of localized environments. For instance, buildings can be constructed with data communication links in the form of coaxial cable, for example, installed in them along with plumbing and power lines. Such buildings can therefore include data terminals in each room or manufacturing area, so that machinery or measuring instrumentation can be plugged into the overall system or removed from it at will. Accordingly, it can be seen that the communication system of the present invention constitutes an ideal network for implementing complete or nearly complete automation of factories, hospitals, accounting facilities, and many other types of data handling institutions.

The present system is also extremely inexpensive to install, since the use of a single, bidirectional communication link to interconnect a plurality of remote stations with a central computer does away with the need for complex interconnection wiring which must be altered or removed each time equipment is changed or replaced. In addition, much less data communication line is required than in conventional systems, since a single cable is used for both receiving and transmitting data signals. be Each of the remote units 26 constitutes a communication interface network for coupling each of a plurality of remote stations 30 thru 66 to the communication link 24. Each of the remote stations 30 thru 66 includes a machine or utilization device for generating raw data or responding to instructions from the central station 10. The system illustrated in FIG. 1 is not necessarily intended to represent a practical system, since it includes a wide variety of utilization devices which would not normally be found in combination in any one system. However, while the system illustrated in FIG. 1 is thus intended primarily to demonstrate the versatility of the communication system of the present invention, all of the different types of utilization devices illustrated could actually be coupled together in an operative network with the present invention. For example, remote station 30 illustrates an out-of-house communicator, or long distance communication network, illustrating that the communication system of the present invention which is primarily adapted for "in-house-" use, may be coupled to a long distance communication network. Similarly, remote station 32 illustrates a data processing facility including a computer with a wide variety of peripheral devices coupled to it. This remote station illustrates that the data communications system of the present invention can be used for coupling computers or data processing units together. Similarly, remote stations 34, 36 and 38 illustrate automatic machine tools, such as an automatic punch, an automatic milling machine, and an automatic lathe connected to the data processing system of the present invention. These remote stations, combined with remote stations 46, 48, 50, 52, 54, and 56, which illustrate respectively, a time clock, a pressure gauge, a scale, a thermometer, a counter, and a thickness gauge, may be coupled together in the very practical environment of an automatic manufacturing facility. Remote stations 58, 60 and 62, which illustrate an EKG monitor, a blood pressure monitor, and a check-writer, may be coupled together in a hospital or medical research facility, for example. Remote stations 64 and 66, illustrating point of sale, accounting equipment and a cash register, respectively, may be usefully interconnected in a retailing establishment such as an automatic store facility, for example. Remote stations 40, 42 and 44, illustrating a CRT display, a card reader and a printer, respectively, may be interconnected in a data processing facility, for example, possibly in combination with a remote station such as 32, illustrating a data processing facility.

Each of the remote stations illustrated in FIG. 1 includes a conventional machine or piece of equipment which is adapted to generate data in the form of electrical signals in response to a measurement or an equivalent operation relating to real or physical phenomena. All of this information is then transmitted directly, without the need for card punching or other time-consuming coding or recording operations, to the central station 10 for appropriate processing. Responses from the central station 10 are similarly converted directly into physical results without need for intermediate coding steps. Although, as pointed out above, the widely varied types of remote stations illustrated in FIG. 1 would not normally be found together, the data communication system of the present invention is capable of handling all of the diverse types of remote station equipment illustrated in FIG. 1 simultaneously, plus others should it be desired to do so.

The general operation of the system illustrated in FIG. 1 will now be described. all transactions are initiated by the CPU 12. This unit assembles the transaction in its memory and adds to the transaction information an address word corresponding to a particular one of the remote stations, each of which has a particular address code. As soon as the CPU is ready, it outputs this information in a parallel word-by-word format to the local unit 16. The local unit 16 receives the information in parallel and converts its to serial data, which is then transmitted serially bit-by-bit to all remote stations coupled to the communication link 24. All remote stations decode the first or address word of all transactions transmitted over the communication link 24. When the decoded address agrees with the address of a particular remote station, that unit turns on to the communication link, and prepares to receive instructional information. If the decoded address does not agree with that of a particular remote station, that station turns off the line and remains inoperative until the start of the next transaction. This arrangement assures that only one remote unit operates at any given time.

If the transaction is such that the CPU 12 expects a reply, the CPU waits for the reply from a particular remote station. When a reply is expected, but the addressed unit has no information suitable to answer the CPU, a code word, which may consist entirely of zero bits, for example, is transmitted by the remote station to the CPU. As noted hereinablve, the data word length may be selected to accommodate existing or available equipment. The CPU accepts this code as indicating no information, and then proceeds to the next transaction. In the event that a remote station fails in the middle of a transaction, an interrupt signal is developed from the lack of data transmissions, and is used to restart the system.

Transmission of data over the communication link 24 is accomplished by means of self-clocking data signals. This arrangement greatly simplifies the system and makes the system completely message-oriented. Thus, it requires no multiplexing, no multiprogramming, no interrupts, and no storing of partially completed programs. Because of this, a smaller and less expensive computer can be used at a given installation, and no expensive multiplexing equipment and fewer modems are required. In addition, the system is ideally suited to take advantage of dynamic or static shift-registered data storage, which provides the lowest cost per bit method of remote storage presently available. The system is designed to allow information requests and appropriate responses to occur over the same cable. Thus, all remote stations are connected to the communication line in a bridging mode. In the instance where it is desirable to branch the transmission line, a branch repeater or retransmit units 28 are provided at an appropriate location.

Figure 2:
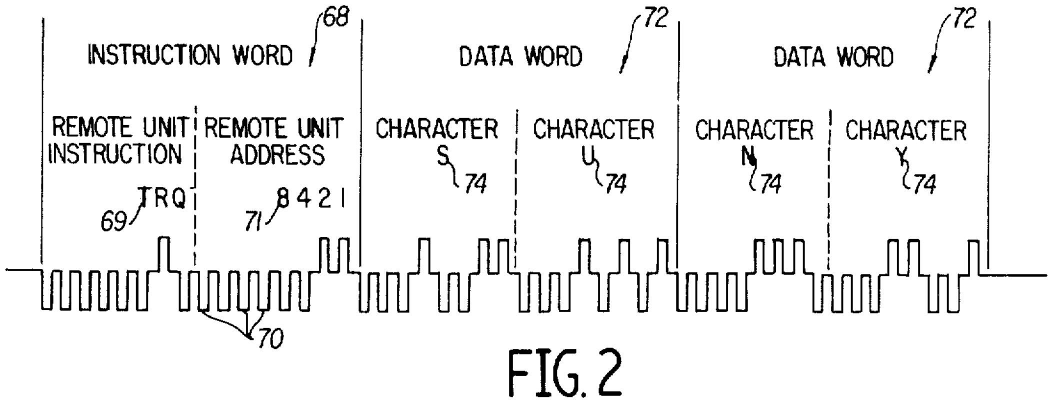
FIG. 2 is a bit format diagram illustrating a particular oding scheme which may be utilized with the system f the present invention.

FIG. 2 illustrates the preferred bit format of the system, which employs sixteen bit data words. The message illustrated in FIG. 2 begins with an instruction word 68 made up of 16 data positions, some of which are denoted by the numeral 70. The instruction word includes a remote unit instruction, which tells the remote unit what phase of operation is expected from it, and also includes a remote unit address 71, which identifies a particular remote unit. Following the instruction word are a plurality of data words 72. The data words, each of which include 16 data positions, may each be comprised of two characters 74. The data words, and the characters included in them, are used to transmit information to and from the remote stations. As emphasized previously, the code is generally flexible, and essentially any number of data positions may be used in a word, and each word may consist of as many characters as desirable. However, it is necessary that the instruction word 68 precede the data words 72 so that individual remote units can be identified and instructed to perform appropriate functions before specific data messages are transmitted to them.

The logic networks and circuitry required to implement the present invention will now be described in more detail. In particular, FIGS. 3 and 4 illustrate in detail the logic networks included in the local unit 16 illustrated in FIG. 1. FIG. 3 illustrates the output section of the local unit 16, which is designed to receive information from the CPU 12 over output lines 20, and feed it to the communication link 24 for transmission to the remote stations. FIG. 4 illustrates the input section of local unit 16 which is designed to receive messages transmitted from the remote stations, and to feed them to the CPU 12 over the input lines 18.

Referring now to FIG. 3, the output section of the local unit 16 includes a parallel output register 76 having a bit storage capacity which is selected in accordance with the data word length chosen for use in the system. As pointed out above, a sixteen bit word length was selected in the preferred embodiment of the instant invention due to the fact that much of existing equipment uses a 16 bit format. However, it will be understood that data words of any length may be used, and that the register capacities of the remote and local units will be adjusted accordingly.

The output register 76 of local unit 16 is coupled directly to an output interface section 78 of CPU 12. The interface circuitry 78 may include, for example, a buffer register which is directly coupled in parallel to the output register 76, and serves to transfer data from the CPU 12 to the local unit 16. Whenever the system is operating, the output section of the local unit 16 is prepared to accept output information from the CPU 12, and to transmit such data over the communication link 24. It should be noted that the CPU initiates all data transfer operations throughout the system through the output section of the local unit 16.

When the output stage of the local unit 16 is in its "ready" state, i.e., whenever the system is operating, but prior to an actual transmission of data, a one megacycle clock 80 and a scale of 16 counter 82 are held in their reset state by a start-and-stop flip-flop 84, which is coupled to them. The scale of 16 counter 82 is also coupled to a 16 bit decoder 86. (Again, it is pointed out that the use of 16 bit components is determined by the fact that 16 bit data words have been selected as the format for the system. Accordingly, where other word lengths are selected, different capacity counters, etc., would be used.) When the scale of 16 counter is in its reset condition, it is decoded by the sixteen bit decoder 86 as having a zero count signal. This signal enables a start AND gate 88, one input terminal of which is coupled to the zero count output terminal of the 16 bit decoder 86.

When the software within the CPU 12 determines that an output is appropriate, the CPU assembles the appropriate information according to the previously described system format (as illustrated in FIG. 2), and loads the first word into the output buffer register or interface circuitry 78. When the buffer register 78 is fully loaded, the CPU 12 delivers a buffer full signal on buffer full line 90, which is coupled to the other input terminal of start gate 88, and then passes in its operation, for an appropriate response from the output line 98 of local unit 16. When the scale of 16 counter 82 is in its reset state and a buffer full signal is applied to line 90, the start AND gate 88 is enabled. Once enabled, the start AND gate 88 triggers a load one-shot 92. The leading edge of the signal generated by load one-shot 92 loads the CPU data word from buffer register 78 into the output register 76 of local unit 16. The same signal is coupled to and operates a release one-shot 94 which, in turn, disables a hold AND gate 96, which is coupled between the release one-shot 94 and the start and stop flip-flop 84. Disabling of the hold AND gate 96 removes a resetting signal from the start and stop flip-flop 84.

The trailing edge of the pulse from load one-shot 92 triggers a start one-shot 97. The output of the start one-shot 97 is coupled both to the start-and-stop flip-flop 84 and to a data received reply line 98, which is, in turn, coupled to CPU 12. The signal emanating from the start one-shot 97 operates the start-and-stop flip-flop 84, setting it in a start mode. The same signal applied to data received reply line 98 indicates to the CPU 12 that a data word has been received by the local unit 16. Upon receiving the data received replay signal from the local unit 16, the CPU 12 goes on to its next software described assignment, leaving the output word stored in the output register 76 of local unit 16.

When the start-and-stop flip-flop 84 is set in the start mode by start one-shot 97, it removes the reset signal from the one megacycle clock 80 and from the scale of 16 counter 82, permitting these circuits to operate. The one megacycle clock 80, in addition to being coupled to the scale of 16 counter 82, is also coupled to a transaction detector 100, the details of which are set forth in more detail in FIG. 7.

Figure 9:
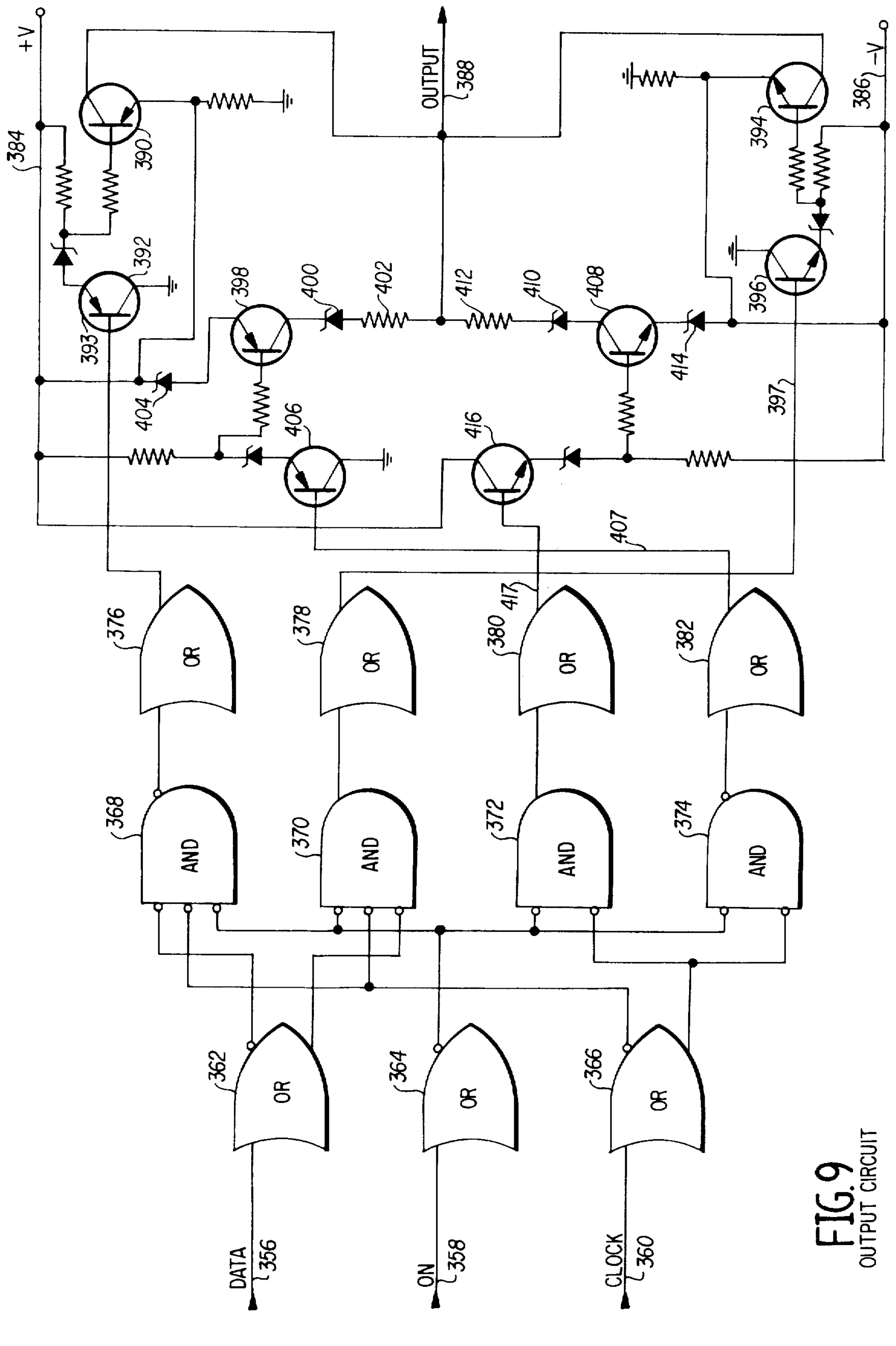
FIG. 9 is a detailed schematic circuit and logic dia-am of a line drive circuit, illustrated generally in IGS. 3 nd 5; and, FIG. 10 is a detailed block and logic diagram of a anch repeater unit, illustrated generally in FIG. 1.

The first clock pulse emanating from the one megacycle clock 80 activates the transaction detector 100. The transaction detector 100 is constructed so that it remains operative as long as clock pulses continue to flow from the one megacycle clock 80. The output of the transaction detector 100 is coupled to the hold gate 96, and signals from the transaction detector maintain the hold gate disabled for the duration of a particular transaction. The one megacycle clock 80 is also coupled to a line drive circuit 102, and the first clock pulse also acts to activate the line drive circuit 102. The details of the line drive circuit are illustrated in FIG. 9.

The line drive circuit 102, which is coupled at its output to the communication link 24, clamps the link 24 to an appropriate matching impedance (such as 75 Ohms of a 75 Ohm coaxial cable is used, for example) and also clamps the link 24 to a plus or minus voltage depending upon whether input data to the line drive circuit represents a "zero" or a "one" data pulse. The line drive circuit 102 is also coupled to a reference potential or ground 103 at its input. Between each output pulse from one megacycle clock 80, the line drive circuit 102 couples the data line 24 directly to the ground or reference potential 103. This establishes a no-signal potential, which is a reference state differing from either a "zero" or "one" data pulse.

The line drive circuit 102 is also coupled at its inputs to a parallel-to-serial converter 104. The parallel-to-serial converter is coupled in parallel to both output register 76 and to 16 bit decoder 86. However, it is coupled in series through line drive circuit 102 to communication link 24, and thereby permits the data, which is transferred from the CPU 12 output buffer 78 in parallel form, to be transmitted over the communication link 24 to all remote stations in a serial fashion.

In operation, the first "not-clock" pulse, or period between pulses from clock 80 advances the scale of 16 counter 82 by a count of one. This count is decoded by the 16 bit decoder 86, causing parallel-to-serial converter 104 to transfer a first information bit to the line drive circuit 102. This data bit is then transmitted over the communication link 24 with the occurrence of the second pulse from the one megacycle clock 80. In addition, the scale of 16 counter 82, which is now no longer in its zero count, or reset state, causes start gate 88 to become disabled. This cyclic operation continues for 16 counts, until the entire 16 bit data word from the CPU 12 is transmitted over the data communication link 24.

If the transaction has additional words, the CPU 12 locates and prepares the next word in the proper format during the period in which the first word is being transmitted from the output section of local unit 16 over the data link 24. Before the sixteenth or final count of the counter 82, the CPU 12 has the next word stored in its output buffer register 78, and the buffer full line 90 is again energized. Thus, at the count of 16, the scale of 16 counter 82 again reaches its reset or zero count state, causing start gate 88 to be enabled. The starting cycle again occurs, maintaining the system in operative condition for continued transmission of data. Accordingly, there is no discontinuity in the output of the one megacycle clock 80. Consequently, the transaction detector 100 continues to be activated and the data output of the local unit 16 is not interrupted.

When the transaction is completed and the CPU 12 has no more data to transmit, the buffer full line 90 which is coupled through an inverter circuit 106 to a stop AND gate 108, in addition to being coupled to start gate 88, is no longer energized. Another input terminal of the stop gate 108 is coupled to the first stage of 16 bit decoder 86, and hence to the scale of 16 counter 82. Accordingly, when the buffer full line 90 is not energized, the inverter circuit 106 causes an inverted buffer full, or buffer empty signal to be applied to one input of stop AND gate 108. At the time when the local unit 16 completes the output of its last data word, the scale of 16 counter 82 again reaches its zero count or reset state, causing an enabling signal to be generated by the zero count stage of the 16 bit decoder 86. This enabling signal does not enable start gate 88, since the buffer full line 90 is not energized. However, the same enabling signal is applied over a line 109 to stop AND gate 108, and in cooperation with the buffer empty signal emanating from inverter circuit 106, causes stop AND gate 108 to become enabled.

The output of stop AND gate 108 is coupled to a stop reset terminal of the start-and-stop flip-flop 84. Accordingly, when the stop AND gate 108 is enabled, it causes the start-and-stop flip-flop 84 to be reset to a stop mode. In its stop mode, the start-and-stop flip-flop 84 stops the operation of the one megacycle clock 80 and the scale of 16 counter 82, and holds both of these devices in their reset state. The cessation of pulses from the one megacycle clock 80 clamps the line drive circuit 102 to ground and also deactivates the transaction detector 100. Deactivation of the transaction detector 100 maintains the circuit in its "ready" state, awaiting the next output transaction from the CPU 12.

Referring now to FIG. 4, the input section of local unit 16 is illustrated. The input section of local unit 16 receives incoming information from all remote stations attached to communication link 24 and applies this information to the CPU 12. Since the CPU 12 controls all transmissions over the communication link 24, input information can be applied to the CPU only at its own request. Thus, since the remote stations can send data to the CPU 12 only when they are instructed to do so, the software of the CPU 12 knows when to expect incoming data. At that time, the computer is ready to accept data and a computer ready line 110 is accordingly activated.

Thus, as soon as the CPU has loaded the last word of a particular data output transaction into the output register 76 of local unit 16, the computer ready line 110 is energized, and the CPU 12 is prepared to receive incoming data. However, the input section of the local unit 16 cannot respond immediately upon the energization of computer ready line 110, since at this time, information is still being transmitted over data link 24 by the output section of local unit 16. To prevent the output information from being read into the computer again, hold gate 96 in the output section of local unit 16 (illustrated in FIG. 3) transmits a busy signal over a line 112 which is coupled to a busy AND gate 114 in the input section of local unit 16 (illustrated in FIG. 4). The other input of the busy AND gate 114 is coupled to an input circuit 116. Thus, when an input signal is received, and a busy signal is simultaneously received by the busy AND gate 114, this gate generates an output which maintains the entire input section of the local unit 16 in its reset or inoperative state. However, upon removal of the busy signal, the input section of the local unit 16 is prepared to operate. Thus, at the end of an output transaction, the busy signal emanating from hold gate 96 terminates, allowing signals from the input circuit 116 to enter the input section of local unit 16.

The incoming response on data communication link 24 is in the same self-clocking format as was the output signal generated by the output section of local unit 16. The input circuit, which is illustrated in detail in FIG. 8, detects the incoming response on data link 24 and converts it into two signals. One of these signals, called the clock signal, represents the bit rate of the incoming transmission. The other signal is the data signal, and it represents the digital pulse data transmitted from the remote stations. The first clock pulse emanating from the input circuit 116 is passed through the busy AND gate 114 to a transaction detector 118. Transaction detector 118 may have the same structure as transaction detector 100 of FIG. 3, and operates in the same manner as transaction detector 100. Transaction detector 118 is coupled at its output to a scale of 16 counter 120, which has the same structure and operation as the scale of 16 counter 82 of FIG. 3.

The clock pulse outputs from input circuit 116 are also coupled through busy AND gate 114 to a delay one-shot 122, which is, in turn, coupled to a shift one-shot 124. The delay one-shot 122 and shift one-shot 124 operate together to produce an output pulse slightly delayed from the clock pulse received from input circuit 116. The output of shift one-shot 124 is coupled both to the scale of 16 counter 120 and to a 16 bit shift register 126. Thus, the shift pulse emanating from shift one-shot 124 drives the scale of 16 counter 120 and also shifts the 16 bit shift register 126 in a regular fashion. The data output of input circuit 116 is also coupled to sixteen bit shift register 126 over a line 127, to permit incoming data to be shifted into the shift register 126. Thus, incoming data is applied directly to the shift register 126 by the input circuit 116, and is shifted along the register by pulses emanating from the shift one-shot 124. The data input cycle continues for 16 clock pulses until all 16 positions of the 16 bit shift register 126 are filled with data signals.

At the 16th clock pulse, the scale of 16 counter 120 generates an output pulse which is coupled to a transfer one-shot 128. The output of the transfer one-shot 128 is coupled to a 16 bit transfer register 130, and to a computer ready AND gate 132. The 16 bit transfer register is coupled in parallel to the 16 bit shift register 126, such that data can be transferred in parallel directly from each stage of the 16 bit shift register 126 to a corresponding stage in the 16 bit transfer register 130. The output pulse generated by the transfer one-shot 128 causes all 16 bits stored in the 16 bit shift register 126 to be simultaneously loaded into the 16 bit transfer register 130. The sixteen bit transfer register 130 is directly coupled to CPU input interface circuitry 133. The 16 bit transfer register 130 is coupled in parallel to the CPU input interface circuitry in order to permit parallel transfer of all information stored in the transfer register 130 to the CPU input register 133.

The trailing edge of the pulse from the transfer one-shot 128, which is fed to one input of the computer ready AND gate 132, while the computer ready signal transmitted on line 110 is fed to the other input of the computer ready AND gate 132, enables the computer ready gate. The computer ready gate is coupled at its output to a load one-shot 134, which is, in turn, coupled through a load line 136 to CPU 12. When enabled, the computer ready AND gate 132 triggers the load one-shot 134 which then transmits a load signal to the CPU input. The load signal indicates that the 16 bit transfer register 130 is loaded, and instructs the CPU computer to transfer the data from the 16 bit transfer register into its input interface circuitry 133, and to continue its program. If the CPU expects more data, it again activates the computer ready line 110 while the next 16 bit data word is being shifted into the shift register 126. If more data is required, the previously described cycling steps are repeated as more data is transferred into the CPU.

When the last bit of the last input data word of a particular transaction has been received, clock pulses are no longer generated by the input circuit 116. This lack of clock pulses causes the transaction detector 118 to become deactivated. Once deactivated, the transaction detector 118 holds all of the circuitry in the input section of the local unit 116 in its reset or "ready" state, thereby preparing it to await the next data input transaction.

A no-transaction detector 138 is coupled to the clock output of input circuit 116 to monitor the activity on the communication link 24. In the event that there has been no data transmission on the line in a selected period of time (for example, 1 second), the no-transaction detector 138 generates a computer interrupt signal which is transmitted over a line 140 to the CPU 12. This signal instructs the CPU computer to type out a descriptive error message alerting the operating personnel of a possible malfunction. After typing the message, the computer goes on to the next transaction. Thus, the no-transaction detector 138 is primarily a timer which functions to indicate a lapse of transmission during a period when data transmission is anticipated by the computer.

Thus, the circuits illustrated in FIGS. 3 and 4 together form the communications interface equipment of local unit 16, which enables the CPU to control all data communications over communication link 24.

Referring again to FIG. 1, data transmissions emanating from or directed to the central station 10 travel over data communication link 24 between all of the remote stations 30 thru 66. Each of the remote stations includes a remote unit 26 which functions as a communications interface between the particular device located at each remote station and the communication link 24. Thus, each of the remote units 26 is somewhat analogous in its function to that of the local unit 16.

Each of the remote units 26 includes a common section which handles communications over communication link 24, and a machine interface section which transfers data to and from a particular piece of remote station equipment. In all cases, the portion of each remote unit 26 which communicates directly with data link 24 is identical. However, since each of the pieces of equipment which are connected to the various remote units may be different, no single machine interface circuit structure may be suitable to perform data transfer operations with each type of equipment attached to the system. Thus, the structure of the machine interface portion of each remote unit 26, which is coupled to, and communicates with the varied different types of machines coupled to the system is dictated by the particular machines in question, since different pieces of equipment have different data input and output requirements. Accordingly, once the specific type of equipment to be coupled to the system is determined, the complete structure of each remote unit 26 can be determined. However, the common portion of each of the remote units 26, which will now be described in detail, is of primary importance, since it links the specific remote station equipment to the overall data communications system of the present invention.

Figure 7:
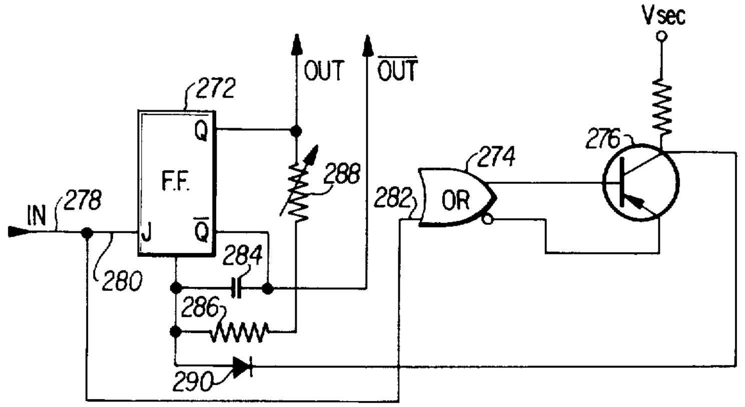
FIG. 7 is a schematic circuit and loic diagram of a ansaction detector illustrated generally in FIGS. 3, 4 ıd 5.
Figure 8:
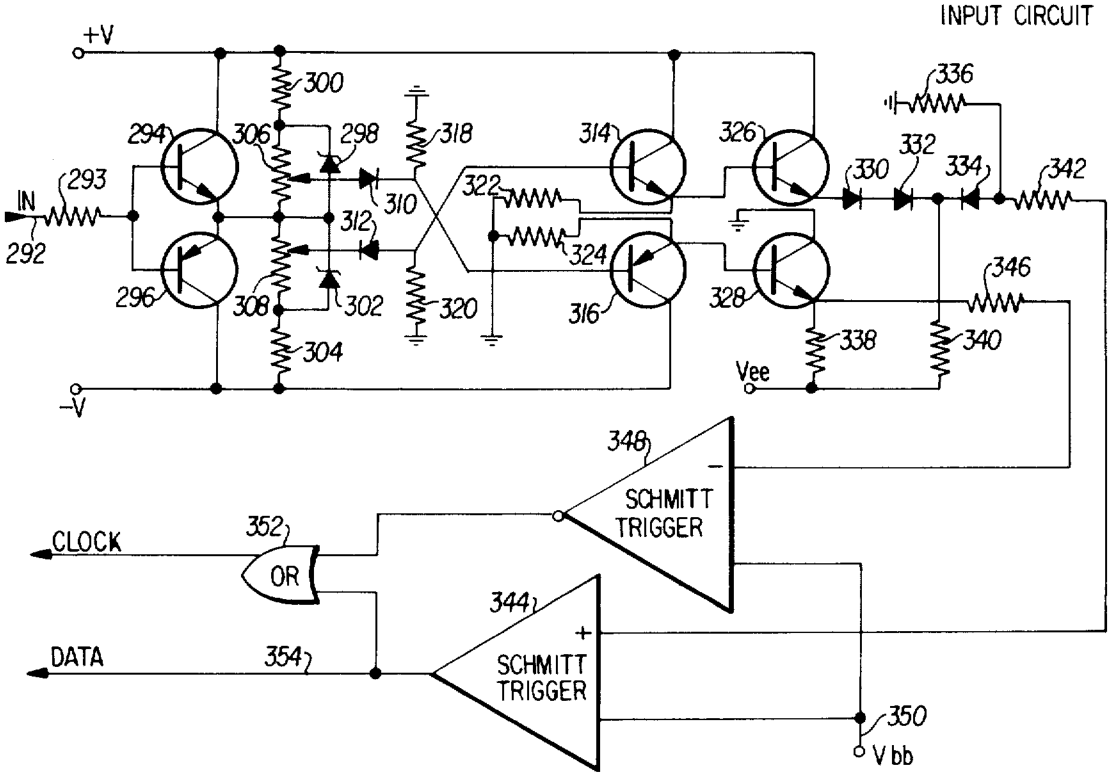
FIG. 8 is a detailed schematic circuit and logic dia-am of an input circuit, illustrated generally in FIGS. 4, and 5.
Figure 5:
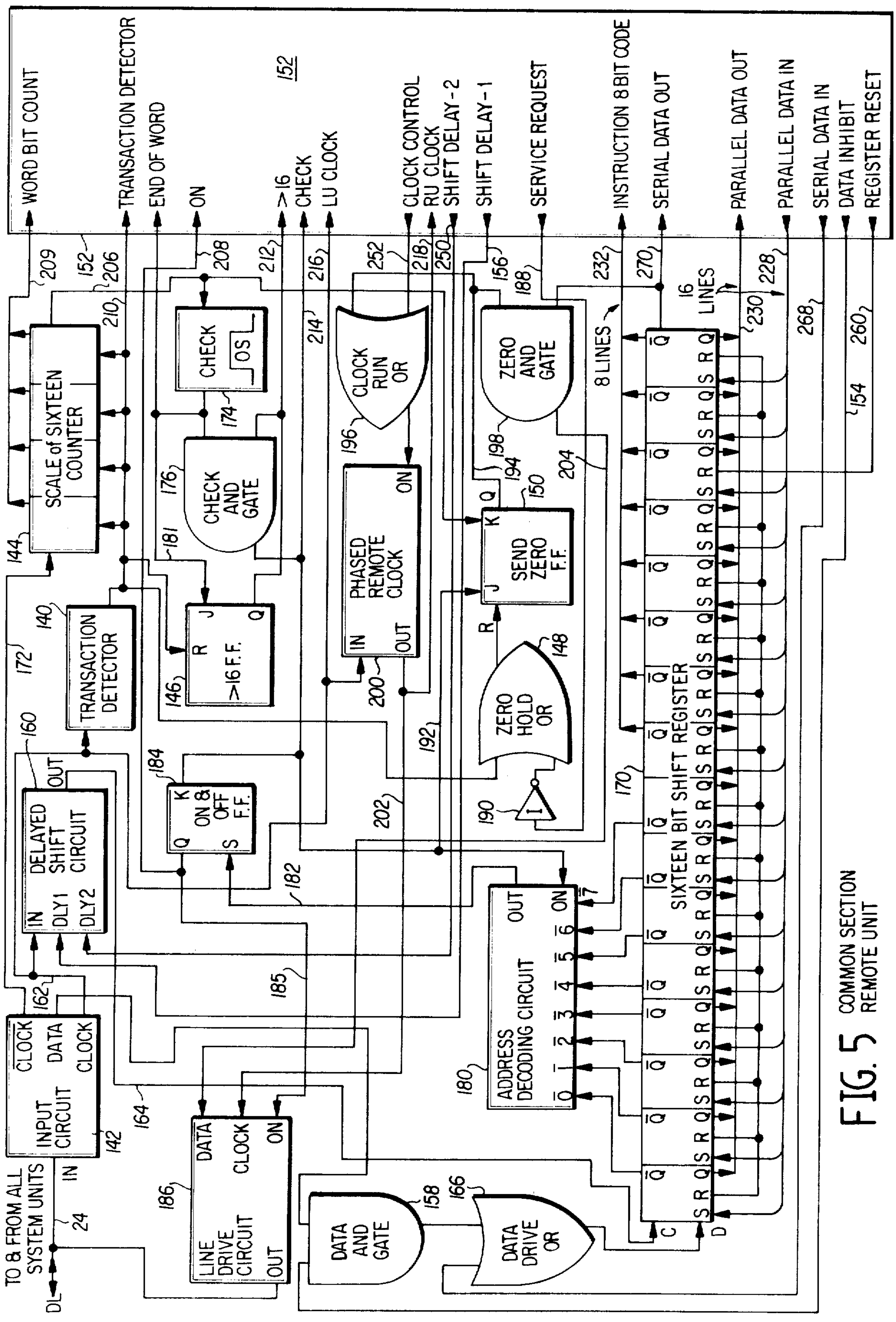
FIG. 5 is a detailed block and logic diagram of a com-ıon section of one of the remote units illustrated gen-rally in FIG. 1.

Referring now to FIG. 5, the common section of each of the remote units 26 is illustrated in detail. Each remote unit 26 includes a transaction detector 140 which is coupled to communication link 24 through an input circuit 142. The details of the transaction detector 140 and the input circuit 142 are illustrated in FIGS. 7 and 8, respectively. The output of transaction detector 140 is coupled to a scale of 16 counter 144, a greater-than-16 flip-flop 146, and through a zero hold gate 148 to a send zero flip-flop 150. When a remote unit 26 is in its "ready" state, i.e., is ready to receive an instruction from the CPU 12, the transaction detector 140 is in its deactivated state. In its deactivated state, the transaction detector 140 produces an output which maintains the scale of 16 counter 144, the greater-than-16 flip-flop 146, and the send zero flip-flop 150 in their reset states. In addition, certain ready state input signals are received from the specific equipment attached to each particular remote unit.

In FIG. 5, the portion of each remote unit 26 which is specifically adapted to form an interface with a particular piece of equipment, along with the functions performed by the particular piece of equipment are illustrated together as a utilization network 152. The utilization network 152 illustrates from the plurality of individual output signals emanating from the common section of each remote unit 26 and also illustrates the input signals, including both data input and control signals, coming from specific piece of equipment attached to a particular remote unit 26. The signals shown are the minimum signals required to carry out operation and control of a piece of equipment. More elaborate signals can be derived from the signals illustrated by combining them and performing additional logical operations of them. However, as was noted above, the specific interconnections made within the utilization network 152 depend upon the type of machine or piece of equipment coupled to each remote unit 26. Once a given piece of equipment is selected for connection to a remote unit 26, it is clear how the signals must be derived and how the various input and output lines from the remote unit 26 must be coupled to the particular piece of equipment.

Returning to the operation of the common section of the remote unit 26, in its "ready" state, input signals are transmitted from the utilization network 152 on a data control line 154 and on a shift delay-1 line 156. The data control signal on line 154 prepares a data input gate 158 for reception of data from communication link 24. The shift delay signal on line 156 is coupled to the delay-1 input of a delayed shift circuit 160, which includes a delay network in combination with a shift register stage. The shift delay signal controls the shift register stage so that data can be shifted into it during clock signals from input circuit 142, and out of it during "not clock" time, i.e., during the period between clock pulses from the input circuit 142. All remaining signal lines from utilization network 152 may be initially deactivated.

Under these conditions, the first data pulse to apear on the data communication link 24, whether it be from the CPU 12 or any other remote unit 26, will cause the input circuit 142 to produce a clock output pulse. This clock output pulse, which is coupled to transaction detector 140 and to delayed shift circuit 160 through a line 162, activates the transaction detector 140, causing it to release the scale of 16 counter 144, the less-than-16 flip-flop 146 and the send zero flip-flop 150 from their respective reset states. The same clock pulse from input circuit 142 operates the delayed shift circuit 160, which, when the shift delay-1 input line 156 is activated, delays the incoming clock pulse one-tenth of a clock cycle. The delayed clock pulse shifts the data signal which is coupled from input circuit 142 to data AND gate 158, through data AND gate 158 and into a data drive OR gate 166. From the data drive OR gate 166, the data input signal is shifted into a 16 bit shift register 170. During the time between data bits on the communication link 24, a "not clock" signal, which represents the time between clock bits, is generated by the input circuit 142 and is coupled to scale of 16 counter 144 over a line 172. This signal advances the scale of 16 counter 144. This action continues in a cyclic fashion until one complete data word of 16 bits has been shifted into the 16 bit shift register 170.

After one complete 16 bit word has been loaded into the register 170, the output of the scale of 16 counter 144 triggers a check one-shot 174. Check one-shot 174 is coupled through a check AND gate 176 and a check line 214 to an address decoding circuit 180. Check one-shot 174 is also coupled over a line 181 to less than 16 flip-flop 146. The leading edge of the pulse signal from the check one-shot 174 enables check AND gate 176 and actuates the address decoding circuit 180. The address decoding circuit 180, which is coupled to the first eight stages of 16 bit shift register 170, compares the information stored in the first eight stages of the 16 bit shift register 170 with a predetermined address code selected for the particular remote unit 26. If the address stored in the eight bit address section of the 16 bit shift register 170 does not agree with the address of the particular remote unit, the address decoding circuit 180 does not generate an output signal at its output, which is coupled over a line 182 to an on-and-off flip flop 184. Accordingly, the on-and-off flip-flop 184, which is initially turned off by the check signal from check one-shot 174, is permitted to stay reset, or switched off, by the lack of a signal from the address decoding circuit 180. The on-and-off flip-flop 184 is also coupled through a line 185 to a line drive circuit 186, which may be structurally the same as the line drive circuit 102 illustrated in FIG. 3. When on-and-off flip-flop 184 is reset to its off state, it permits line drive circuit 186 to "float" on the data communication link 24. Thus, the line drive circuit 186 is effectively inactivated by the failure of the address decoding circuit 180 to detect the proper address of the particular remote unit 26.

The trailing edge of the pulse signal from the check one-shot 174 sets the less-than-16 flip-flop 146. The signal thus generated from the less-than-16 flip-flop 146 is fed to and inhibits the check AND gate 176, so that no more check signals can be passed through the ate. The lack of check signals keeps the remote unit rom responding to any of the remaining incoming data its in the particular transaction. At the end of the ransaction, incoming clock signals cease, and the ransaction detector 140 is accordingly deactivated, reetting the circuits which are connected to it to their ready" states, thereby preparing the remote unit to espond to the next transaction to come over the data ommunication link 24.

However, if the address transmitted over the data ink 24 and shifted into 16 bit shift register 170 coinides with the address stored in the address decoding ircuit 180, the address decoding circuit 180, when urned on by the check signal from check one-shot 174, enerates an output signal which is fed to the on-and-ff flip-flop 184, setting that flip-flop in its "on" state. n its "on" state, the on-and-off flip-flop 184 clamps he line drive circuit 186 to a reference potential, such s ground. The trailing edge of the pulse signal from the heck one-shot 174 then sets the less-than-16 flip-flop 46, which performs its previously described function.

If a particular remote unit has no service requireents, that is, requires no particular input instructions nd has no available data to transmit to the CPU 12, its ervice request line 188 carries no signal. The service equest line 188 is coupled from the utilization network 52 through an inverter 190 to the zero hold OR gate 48, which is, in turn, coupled to the send zero flip-flop 50, as previously described. The lack of signal on the ervice request line 188, following the transaction deected signal from transaction detector 140, causes end zero flip-flop 150 to be released. The on-and-off ip-flop 184 is also coupled via a line 192 to the send ero flip-flop 150. Thus, when the send zero flip-flop is eleased by the lack of a signal transmitted over the serice request line 188, and an "on" signal is transmitted om the on-and-off flip-flop 184, the send zero flipop 150 is set to send an all zero data word to the CPU 2. The function of the all zero data word is to satisfy e software code requirement for describing to the PU 12 that a particular remote unit has no response formation.

To send 16 zero bits, the output of the send zero flipop 150 is coupled over a line 194 to a clock run OR ate 196 and to a zero AND gate 198. The clock run R gate 196 is coupled through a phase remote clock 00 and a line 202 to a clock input of the line drive circuit 186. The send zero output signal from the send ero flip-flop 150 inhibits the zero AND gate 198, hich is coupled through a line 204 to the date input f the line drive circuit 186. The inhibited zero AND ate causes the data input of the line drive circuit 186 be locked at the zero logic level. The send zero signal multaneously acts through the clock run OR gate 196 switch on the phase remote clock 200. The phase reote clock 200 supplies clock pulses over the line 202 the line drive circuit 186, allowing it to send the all ero data word to the local unit 16 and thence to the PU 12.

All data transmitted from the remote unit is sent not nly to the local unit 16, but to all other remote units s well, since all are simultaneously coupled to the ommunication link 24. However, the all zero signal as meaning only to the CPU and accordingly affects nly it, and does not influence any of the other remote nits. In fact, the data being transmitted from a particur remote unit operates its own input circuit 142, and thus incoming clock signals cause the transaction detector 140 to be activated and "not clock" signals advance the scale of sixteen counter 144. The scale of 16 counter 144 is coupled via a line 206 to the send zero flip-flop 150. Thus, the 16th count signal recorded in the scale of 16 counter 144 is used to reset the send zero flip-flop 150. Resetting of the send zero flip-flop 150 causes the phased remote clock 200 to be switched off, ending the clock signals once 16 of them have been sent. The lack of clock pulses then causes the transaction detector 140 to deactivate, again resetting all of the circuits coupled to it to their "ready" state, and putting the remote unit in condition to receive the next transaction.

If the remote unit required service either to receive or transmit data, a signal exists on the service request line 188. The existence of such a signal prevents the send zero flip-flop 150 from being set, and the ON signal from the on-and-off flip-flop 184, which is coupled through a line 208 to the utilization network 152, acting in conjunction with the service request signal on line 188 would cause the equipment included in the utilization network 152 to perform the operation requested by the instructional portion of the received data bit code.

Signals indicating the various logical functions performed in the common section of the remote unit are fed to the utilization network 152 to permit control of the apparatus included in the utilization network. Thus, the output of scale of 16 counter 144 is coupled to the utilization network 152 over lines 209 to provide the utilization network with the count status of the scale of 16 counter. Similarly, the status of the transaction detector is supplied to the utilization network 152 over a line 210. The less-than-16 signal which is coupled to utilization network 152 on a line 212 acts to inhibit the check AND gate 176 for preventing additional signals from being processed by the system. Thus, the less-than-16 signal on line 212 can be used to switch off or inactivate equipment in the utilization network 152. Similarly, the check, local unit clock and remote unit clock signals are coupled to utilization network 152 on lines 214, 216, and 218, respectively, to provide the utilization equipment with appropriate reference signals.

In order to describe in more detail the manner in which data transactions are carried on with specific utilization devices, an exemplary interface section of a remote unit is illustrated in FIG. 6. The interface section illustrated in FIG. 6 includes a utilization device 220, which may be a conventional time clock, a piece of electronic equipment, or any of the other wide variety of devices that may be coupled to the data communication system of the instant invention. The utilization device illustrated includes a sixteen bit parallel output format, denoted by 16 output lines 222. The sixteen output lines 222 are coupled in parallel to a 16 bit shift register 224. The 16 bit register is coupled in parallel to sixteen AND gates 226 which control the dumping or data output of the 16 bit register 224. The sixteen AND gates 226 are coupled by means of 16 parallel data input lines 228 to the stages of 16 bit shift register 170 in the common section of the remote unit illustrated in FIG. 5. A similar parallel register arrangement may be coupled to the parallel data output lines of 16 bit shift register 170 for transferring data from the communication link 24 to the utilization device 220. This output network is not illustrated for the sake of brevity, since its structure and operation are obvious from the foregoing description. Similarly, an eight bit instruction code output 232 may be used to couple the eight final stages of 16 bit shift register 170 to an instruction decoder located in the interface section of the remote unit to transmit operating instructions from the CPU 12 to the utilization device 220. The specific structure of this apparatus is not included in the Drawings for the sake of brevity. Its operation is similar to that of the address decoding circuit 180, and its specific structure will be obvious to those skilled in the art.

Referring again to FIG. 6, the operation of the interface section of the remote unit will now be described. The operation to be described begins after the first sixteen bits of information are transferred into the sixteen bit shift register 170, and after it is determined that the address information matches that of the particular remote unit. At this point, the ON line 208, which is coupled to an address check one-shot 234, carries a logical 1 signal. This signal triggers the address check one-shot 232, positively indicating to the interface section of the remote unit that the address detected is the proper address identifying the remote unit.

The output of the address check one-shot 234 is coupled to one input of an AND gate 236. A new data flip-flop 238 is coupled to the other input of AND gate 236. The set input of new data flip-flop 238 is coupled over a new data line 240 to the utilization device 220. Thus, if the utilization device 220 possesses new data which is desired by the CPU 12, the new data line 240 is energized, setting new data flip-flop 238. The same signal is trasmitted over a line 242 to the load input of 16 bit shift register 223, to load the first word of the new data into the register 224. A busy line 244 couples one output of the new data flip-flop 238 to the utilization device 220 for indicating that the network is temporarily incapable of handling a new data transmission. The same output of new data flip-flop 238 is coupled to AND gate 236, as noted previously.

If the new data flip-flop 138 is set by an appropriate new data signal from utilization device 220, AND gate 236 is enabled. The output thus generated by AND gate 236 is coupled to the set input of a send data flip-flop 246. Thus, if the new data flip-flop 238 is in its set condition, the ON signal on line 208 causes the address check signal from address check one-shot 234 to enable AND gate 236 and set send data flip-flop 246.

The output of the send data flip-flop 246 performs numerous functions in the common section of the remote unit. Thus, the output of the send data flip-flop 246 is coupled over a line 248 to a shift delay-2 input 250 of the common section and to a clock control input 252, also of the common section. The shift delay-2 input 250 is coupled to the delay-2 input of the delayed shift circuit 160, and adjusts the delay period of that circuit. The clock control input 252 is coupled through clock run OR gate 196 to phased remote clock 200, and switches on the phased remote clock to provide clock pulses for continued operation of the transaction detector 140. The send data flip-flop 246 is also coupled to the data inhibut line 154 and the service request line 188 of the common section of the remote unit. The signal thus applied to the data inhibit line 154 prevents the new data coming from the utilization device 220 from being misinterpreted as data transmitted from the CPU 12 over data communication link 24. The signal on the service request line 188 is coupled through inverter 190 and zero hold OR gate 148 to send zero flip-flop 150 for preventing the send zero operation described previously. The output of the send data flip-flop 246 is also coupled over a line 253 to an AND gate 254 for the purpose of enabling the AND gate.

Once the clock control signal on line 252 is generated by the send data flip-flop 246, the remote unit clock or phased remote clock 200 is in control of the system. Thus, the data transaction is carried on by shifting out the original 16 bits stored in shift register 170 over the data communication link 24. It will be recalled that the information stored in the register 170 includes the address of the particular remote unit as well as the instruction to be performed by it. Thus, by shifting this information out onto the communication link 24, the CPU 12 is informed as to which remote unit is communicating with it and is also informed as to the type of instruction that the remote unit is performing.

After the first 16 bits are shifted out of register 170, a word bit count signal from scale of 16 counter 144 is transmitted over a line 209 to AND gate 254. This signal, acting in conjunction with the signal from send data flip-flop 246, enables AND gate 254. The output of AND gate 254 is coupled to a delay one-shot 256, which is coupled at its output to a load one-shot 158, and is also coupled over a reset line 260 to a 16 bit shift register 170. In operation, the leading edge of the output pulse from the delay one-shot 256 resets all stages of the sixteen bit shift register 170. Then, after a preset delay period, the trailing edge of the pulse from delay one-shot 256 operates the load one-shot 258. The load one-shot 258 is coupled at its output to both the dump input of the 16 AND gates 226 and to the reset input of the new data flip-flop 238. Thus, the signal from the load one-shot 258 dumps the data stored in 16 bit shift register 224 via parallel input lines 228 into 16 bit shift register 170. The data thus transferred into the register 170 is subsequently shifted out onto the data communication link 24 in the manner previously described. As the signal from the load one-shot 258 terminates, it resets the new data flip-flop 238, indicating to the utilization device 220 that the sixteen bit shift register 224 is no longer busy.

If more data is loaded into the 16 bit shift register 224 while the previous 16 bits is being transmitted, the new data flip-flop 238 is again set by the signal emanating from the utilization device 220 over the line 240, and the word count transmitted over line 209 causes the previously described data transmitting action to be repeated. If utilization device 220 has no more data to transmit, the new data flip-flop 238 is not set, and accordingly remains in its reset condition. In this condition, the new data flip-flop, which is coupled to an AND gate 262 over a line 264, prepares the AND gate 262 to be enabled by the word bit count transmitted over line 209. Thus, when the word bit count is received on line 209, instead of recycling the data transmitting operation, it enables AND gate 262, thereby transmitting a signal over a line 266 to the reset input of send data flip-flop 246. The send data flip-flop 246 is thus reset, causing the phased remote clock 200 to be switched off, in turn causing the transaction detector 140 to be switched off, terminating the data transmission.

If utilization device 220 had no data to transmit initially, AND gate 236 would have prevented any response from the interface section of the remote unit. The lack of a signal on the service request line 188 would then have allowed the send zero operation to occur, and a word of zeros would have been sent to the CPU 12, indicating that the remote unit had no data to transmit.

Referring briefly to FIG. 5, the 16 bit shift register 170 includes a serial data input line 268 and a serial data output line 270. While these lines are not utilized with the interface section of the remote unit illustrated in FIG. 6, they may be utilized where the utilization device 220 includes a serial data input and output network. In this case, the 16 bit shift register 224, and sixteen AND gates 226, and other associated circuitry would be eliminated. In their place, serial data transfer circuits would be substituted.

Referring now to FIG. 7, the circuitry included in the transaction detectors described generally in FIGS. 3, 4, and 5 is shown in detail. The transaction detector of FIG. 7 operates in the same manner as a re-triggerable monostable multivibrator. It includes a flip-flop 272, an OR gate 274, and a transistor 276 coupled to the output of the OR gate. Input signals are applied at an input terminal 278 which is coupled over a line 280 to the set input of the flip-flop 272 and over a line 282 to the input of OR gate 274. Thus, the application of an input signal to terminal 278 causes the flip-flop 272 to be set, and causes a signal to be transmitted through OR gate 274 to the base of transistor 276, switching the transistor to its non-conductive state.

A capacitor 284 is coupled to the reset terminal of flip-flop 272. Thus, the potential developed on the capacitor 284 determines whether the flip-flop 272 will be reset. The capacitor 284 has two discharge paths. One discharge path is through transistor 276, and the other is through a resistor 286 and a potentiometer 288. A diode 290 is placed in the discharge circuit passing through transistor 276, thus effective blocking this discharge circuit, so that the capacitor 284 may only discharge through the circuit including resistor 286 and potentiometer 288.

In operation, the input signal switches off transistor 276, as previously described. This permits the capacitor 284 to charge to its maximum voltages. The removal of the input signal permits the transistor 276 to be switched on; however, diode 290 prevents capacitor 284 from discharging through transistor 276. Thus, the capacitor must discharge through resistor 286 and potentiometer 288. The time required for the capacitor to thus discharge is determined by the RC value of the components involved. The flip-flop 272 will not reset until the capacitor 284 is substantially discharged. Thus, the flip-flop 272 remains set while the capacitor is discharging, and will only reset after a period of time which depends upon the aforementioned RC value. However, if another input pulse arrives before the capacitor 284 is sufficiently discharged, the capacitor will recharge and the flip-flop 272 will remain reset. Thus, the transaction detector supplies an output signal starting with the reception of a first input signal, and remaining as long as signals arrive at the input terminal within the RC time constant.

Referring now to FIG. 8, the input circuit illustrated generally in FIGS. 4 and 5 is shown in detail. Generally, the circuit of FIG. 8 is set to give no output signal if the input signal is within the limits of a predetermined dead band, such as from −0.75 volts to +0.75 volts. If the input signal is above the upper limit of the dead band, a logical 1 signal is generated and if the input signal is below the predetermined dead band, a logical 0 signal is generated. If a logical 1 signal is generated, both a data output and a clock output are produced, while if a logical 0 signal is generated, only a clock output is produced.

In the circuit, an input terminal 292 is connected through a coupling resistor 293 to the base electrodes of a pair of transistors 294 and 296. The emitters of the two transistors are coupled together, while the collector electrode of transistor 294 is coupled to a positive voltage source and the collector electrode of transistor 296 is coupled to a negative voltage source. The emitters of the two transistors are coupled through a zener diode 298 and a biasing resistor 300 to the positive voltage source and through a zener diode 302 and a biasing resistor 304 to the negative voltage source. A pair of potentiometers 306 and 308, coupled together between the biasing resistors 300 and 304, are selectively adjusted to provide a suitable back bias voltage to a pair of diodes 310 and 312, respectively. The back bias voltage set by potentiometer 306 determines the positive maximum value of the dead band while the back bias set by potentiometer 308 determines the negative maximum value of the dead band. Thus, the potentiometers 306 and 308 provide a means of appropriately setting the dead band to a desired value.

The back bias provided by potentiometers 306 and 308 maintain diodes 310 and 312, respectively, cut off for input voltages which fall within the dead band region. When the diodes 310 and 312 are cut off, no current is applied to the base electrodes of a pair of transistors 314 and 316, which are respectively coupled to diodes 310 and 312. Accordingly, the transistors 314 and 316 remain switched off or non-conductive when input voltages are within the preselected dead band. Biasing resistors 318 and 320 are coupled to the base electrodes of transistors 314 and 316, respectively, while biasing resistors 322 and 324 are coupled to the emitter electrodes of transistors 314 and 316, respectively.

The emitter electrodes of transistors 314 and 316 are also connected to the base electrodes of a pair of transistors 326 and 328, respectively. Transistors 326 and 328 remain non-conductive when transistors 314 and 316 are non-conductive. The emitter electrodes of transistors 326 and 328 are coupled to a plurality of diodes 330, 332 and 334, as well as to a plurality of biasing resistors 336, 338 and 340.

The emitter electrode of transistor 326 is also connected through a coupling resistor 342 to one input of a positive Schmitt Trigger 344. Similarly, the emitter electrode of transistor 328 is connected through a coupling resistor 346 to one input of a negative Schmitt Trigger 348. The other input of both Scmitt Triggers is coupled through a line 350 to a suitable voltage source. The output of both Schmitt Triggers is coupled to an OR gate 352 which is adapted to generate a clock output. The output of positive Schmitt Trigger 344 is coupled to an output line 354, and is adapted to generate data signal outputs.

In operation, when the transistors 326 and 328 are not conducting, the outputs of the respective Schmitt Triggers 344 and 348 are both zero. This condition is equivalent to the outputting of a logical 0, and both the data and clock outputs are a logical 0. However, if the signal applied to the input terminal 292 is above the limit of the preset dead band (e.g., +0.75 volts), then the emitter of transistor 294 also becomes positive. This causes diode 310 to conduct, passing the input signal through transistor 314 and transistor 326 to the positive Schmitt Trigger 344. Thus, the output of the positive Schmitt Trigger 344 goes to a logical 1 making the data output on line 254 a logical 1 and making the clock output of OR gate 352 a logical 1. Similarly, if the signal applied to input terminal 292 is below the lower limit of the preselected dead band (e.g., below −0.75 volts), the emitter of transistor 296 is similarly made negative. This causes transistor 312 to conduct, passing the input signal through transistors 316 and 328 to the negative Schmitt Trigger 348. The output of the negative Schmitt Trigger 348 thus goes to a logical 1, making the clock output of OR gate 352 a logical 1. However, in this case, the data output on line 354 remains at a logical 0.

Referring now to FIG. 9, the output circuit illustrated generally in FIGS. 3 and 5 is shown in greater detail. The output circuit includes three input terminals, which are designated as a data input terminal 356, an "ON" terminal 358, and a clock input terminal 360. These input terminals are coupled through three OR gates 362, 364 and 366, respectively, to a logic network. The logic network includes four AND gates 368, 370, 372, and 374, which are coupled through four OR gates 376, 378, 380, and 382, respectively, to a transistor switching network. The switching network includes a positive voltage source +V which is coupled to a line 384 and a negative voltage source −V, which is coupled to a line 386. The switching network operates to control the potential on an output line 388 which forms the heart of the communication link 24, when a coaxial cable is used.

A transistor 390 is coupled to the output line 388 at its collector electrode and through a resistor to ground at its emitter electrode. The base of this transistor is coupled to the emitter electrode of a control transistor 392 which is in turn coupled through a line 393 to OR gate 376. When control transistor 392 is triggered by a signal from OR gate 376, it in turn triggers transistor 390, which clamps the output line 388 to ground, or a suitable reference potential. Similarly, a transistor 394 is coupled at its collector electrode to the output line 388, and at its emitter electrode to ground or a suitable reference potential. The base electrode of this transistor is coupled to the emitter electrode of a control transistor 396. The base electrode of control transistor 396 is coupled over a line 397 to the output of OR gate 378. Thus, when the control transistor 396 is triggered by an output from the OR gate 378, it in turn triggers the transistor 394 which also causes the output line 388 to be coupled to ground or its suitable reference potential.

A transistor 398 is coupled at its collector electrode through a zener diode 400 and a coupling resistor 402 to the output line 388. The transistor 398 is also coupled through a zener diode 404 to the line 384 which is in turn coupled to the voltage source +V. The base electrode of transistor 398 is coupled to the emitter electrode of a control transistor 406. The base electrode of the control transistor 406 is coupled via a line 407 to the output of OR gate 382. Thus, an output signal passing through OR gate 382 triggers control transistor 406 which in turn triggers transistor 398. When the transistor 398 is thus triggered, it clamps output line 388 to the voltage represented by the source +V, less a predetermined voltage represented by the drop across the zener diodes 404 and 400.

Similarly, a transistor 408 is coupled at its collector electrode, through a zener diode 410 and a coupling resistor 412, to the output line 388. The transistor 408 is coupled at its emitter electrode to a zener diode 414 which is in turn coupled to line 386 carrying the voltage −V. The base electrode of transistor 408 is coupled to the emitter electrode of a control transistor 416. The base electrode of the control transistor 416 is in turn coupled over a line 417 to the output of OR gate 380. Again, an output signal passing through OR gate 380 triggers control transistor 416 which in turn triggers transistor 408. Once triggered, transistor 408 clamps output line 388 to a negative potential represented by the value of the voltage source−V, less the voltage drops across the zener diodes 410 and 414.

In operation, when no signal is applied to the ON terminal 358, the output line 388 floats with a high impedance, such as 20,000 Ohms, for example, since transistors 390, 394, 398, and 408 are all turned off. When an "ON" signal is applied to terminal 358, and no signal is applied to clock input terminal 360, the AND gate 368 and 370 are enabled, causing transistors 390 and 394 to be triggered. Thus, transistors 390 and 394 clamp the output line 388 to ground. This operation occurs regardless of the input applied to the data input terminal 356. When a logical 1 input is applied to the "ON" input terminal 258 and a logical 1 input is applied to the clock input terminal 360, AND gates 368 and 370 are immediately disabled, turning off transistors 390 and 394. Simultaneously, either AND gate 370 or AND gate 374 is enabled, depending upon the signal applied at the data input terminal 356. If a logical 1 is applied at the data input terminal 356, AND gate 374 is enabled, triggering transistor 398. This causes the output line 388 to be clamped to a positive voltage, indicating a logical 1 output on the output line 388. Similarly, if a logical 0 is applied to the data input terminal 356, the AND gate 372 is enabled, triggering transistor 408. Transistor 408 then clamps output line 388 to a negative voltage, indicating the output of a logical 0 on the output line 388.

It will be noted that the circuit of FIG. 9 includes various coupling resistors and biasing resistors and zener diodes which have not been specifically discussed since their function will be obvious to those skilled in the art.

Figure 10:
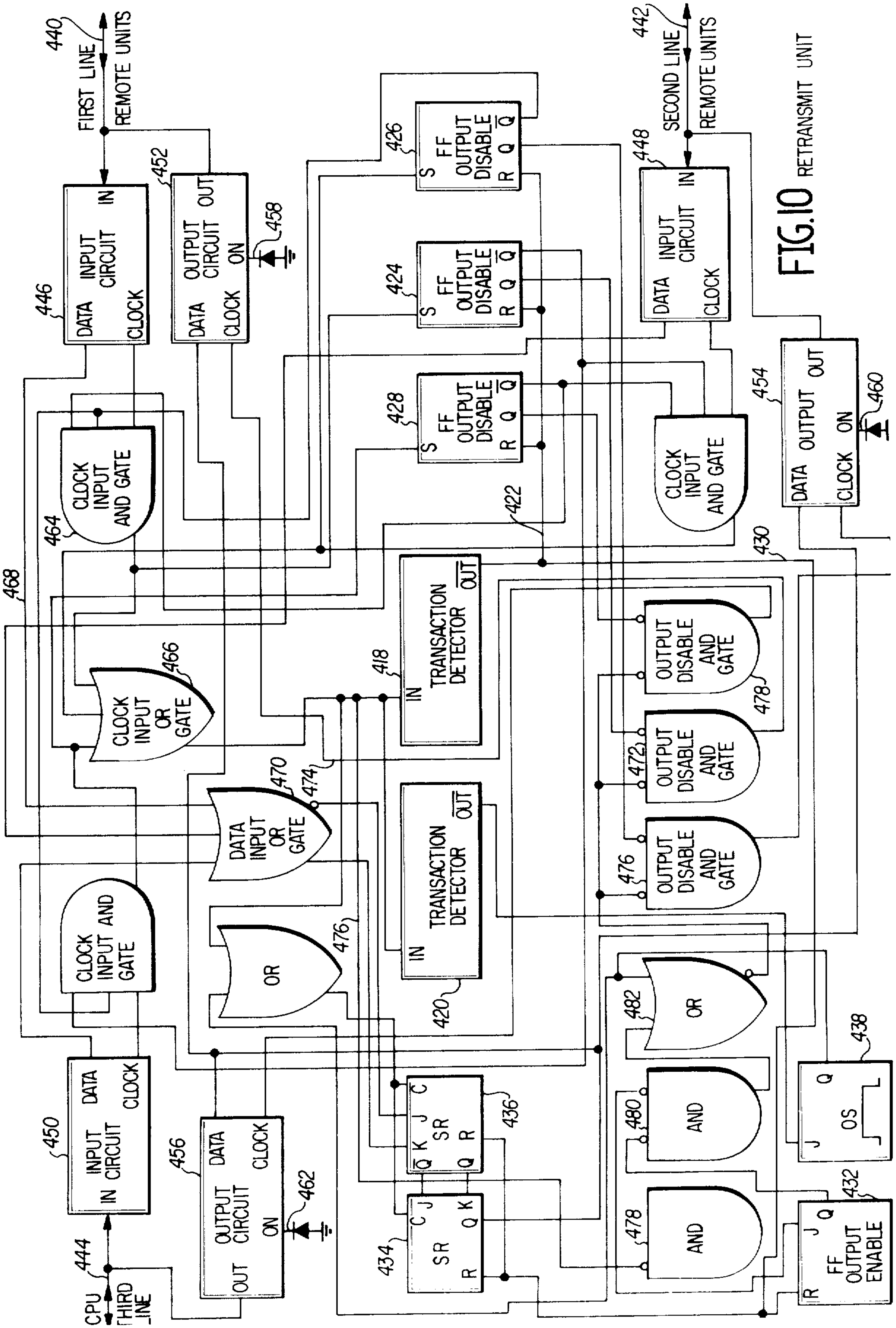

Referring now to FIG. 10, the retransmit unit or branch-repeater unit 28 of FIG. 1 is shown in greater detail. The retransmit unit illustrated in FIG. 9 includes two transaction detectors 418 and 420 which may have circuit configurations identical to that illustrated in FIG. 7. The transaction detector 418 is coupled at its output to the reset inputs of three output disabling flip-flops 424, 426 and 428. The output of transaction detector 418 is also coupled over a line 430 to the reset input of an output enable flip-flop 432. The same line is coupled to the reset inputs of two shift register stages 434 and 436. The output of transaction detector 420 is coupled to the reset input of a final pulse one-shot 438. When the retransmit circuit is in its quiescent state, the transaction detectors 418 and 420 maintain all of the circuits just enumerated, which are coupled to their outputs, in their reset states. In this condition, the retransmit unit is ready to receive and process data transactions.

The retransmit unit illustrated in FIG. 10 is shown coupled to three data lines, designated a first line 440, a second line 442, and a third line 444. The third line 444 may be the data communication link 24 which couples the retransmit unit with the CPU 12, for example. The first and second lines 440 and 442 may represent branches of the data communication link 24 which are coupled to different groups of remote units or stations. Although only two such branch lines are illustrated in FIG. 10, it will be apparent from the following description that any number of branch lines may be included in the retransmit unit, provided that logic for controlling each of the added branch lines is provided. The first, second and third lines include input circuits 446, 448 and 450, respectively, which may have the same circuit configuration as that illustrated in FIG. 8. Similarly, the first, second and third lines include output circuits 452, 454, and 456, respectively, which may have the same circuit configuration as that illustrated in FIG. 9. However, the output circuits 452, 454, and 456 each include ON inputs 458, 460 and 462, respectively, which are coupled through respective diodes to ground, or a suitable reference potential. This arrangement insures that each of the output circuits always has an "ON" input.

The function of the retransmit unit is to accept data transmitted over any portion of the previously described data communication link 24, store this data for a period equivalent to one clock pulse and then output the data on all lines except the one on which it was received. This action continues uninterrupted until the end of a transaction is detected. Thus, the operation of the retransmit unit is identical, regardless of whether the data transaction is received on the first line, the second line, or the third line, 440, 442 or 444, respectively.

Assuming that a data transaction is received over the first line 440, the input circuit 446 is initially activated. The input circuit 446 then passes a clock pulse through a clock input AND gate 464, which is enabled by appropriate outputs from output disable flip-flops 426 and 428. The clock input signal from AND gate 464 passes through a clock input OR gate 466 to the input terminals of transaction detectors 418 and 420, activating both transaction detectors. Once the transaction detectors are activated, they release the circuits previously described as being held in their reset states, to permit these circuits to operate in their normal fashion. This same input causes output disable flip-flop 424 to be set. The output of output disable flip-flop 424 is coupled to an output disable AND gate 472 and is of such a nature that is disables the AND gate. The output of AND gate 472 is coupled over a line 474 to the clock input of output circuit 452, associated with the first line 440. Disabling of AND gate 472 prevents a clock signal from being applied to the output circuit 452, and thus causes the output of the output circuit 452 to be clamped to ground. This prevents any of the incoming data from first line 440 from being retransmitted over the first line. The first clock input pulse is also transmitted over a line 476 and through an AND gate 478 to the output enable flip-flop 432. The signal triggers the output enable flip-flop 432, causing it to supply an output signal to an AND gate 480. This gate, which is enabled by the incoming clock pulse, then transmits a signal through an OR gate 482 to the three output disable AND gates 472, 476 and 478. Output disable AND gates 476 and 478, which are coupled to output disable flip-flops 426 and 428, respectively, are enabled by the output signal from output enable flip-flop 432. These output disable AND gates which are coupled to output circuits 448 and 456, respectively, permit these output circuits to operate. Accordingly, data output transactions may be transmitted over the second line 442 and the third line 444. As described previously, output disable AND gate 472 is not enabled, and therefore no output can be transmitted over first line 440. Thus, the retransmit unit prevents data from being transmitted over the line on which the data was received, but permits the data to be retransmitted over all other lines attached to the unit.

Incoming data signals are applied over a line 468 through a data input OR gate 470 and then to the shift register stage 436. After being stored in the shift register stage 436 for one clock interval, the data signals are shifted to the second shift register stage 434. Output signals from the second shift register stage 434 are then applied to the data input terminals of each of the output circuits, 452, 454 and 456. The output pulses are then transmitted over the output lines attached to the output circuits 454 and 456. As previously described, the output circuit 452 is inactivated, and consequently it does not transmit any data output pulses. This action continues as long as data pulses continue to be received by the retransmit unit.

However, when the first clock pulse arrives with no corresponding data pulse, the transaction detector 420 deactivates, causing final pulse one-shot 438 to be triggered. The output signal from the final pulse one-shot 438 acts as a clock pulse which causes the last data signal stored in the shift register stage 434 to be shifted into the output circuits. After the termination of the signal from final pulse one-shot 438, the transaction detector 418 deactivates, resetting the entire unit in preparation for the receipt of the next data transaction.

Incoming data on the second and third lines 442 and 444 causes the retransmit unit to operate in the same manner as incoming data on line 1, as was pointed out previously. In addition, any number of branch lines may be coupled to the retransmit unit provided suitable additional logic networks are added to the retransmit wall. In its operation, the retransmit unit serves to amplify data in addition to allowing branches in the data communication link 24. Thus, retransmit unit coupled into a single branch of the data communication link 24 may be used to amplify signals travelling over the data communication link, thereby permitting the communication link to be extended to greater distances.

Returning to a consideration of the present invention as a whole, certain features of the general system will now be discussed in greater detail.

First, the communication link 24 may include hybrid elements. For example, it may primarily consist of a single coaxial cable, but may include a laser beam branch for interconnecting two segments which are separated by a barrier not easily traversed by a conventional coaxial cable.

Where the remote units are coupled to a coaxial cable, the interconnection is made in what may be called a bridging mode. That is, the coaxial cable may be coupled to a terminal similar to a conventional power output terminal in that it has two receptacles. The two receptables may not be permanently coupled together. However, if the gap between the two receptacles represents a gap in the single data line of the instant invention, it consequently must be bridged for the line to operate properly. Accordingly, when a remote unit is coupled to the line, it can be coupled so as to include a short circuit or bridge between the two data line receptacles, thus maintaining the continuity of the data line. Similarly, if a data receptacle is located at a position where no remote unit is to be coupled to it, the two receptacles must be bridges or short-circuited together to maintain the continuity of the data line.

Although the specific embodiments of the remote units and of the local unit described and illustrated in the accompanying Drawings have all included parallel transfer registers and other associated equipment for implementing the parallel transfer of data signals, the system will also operate on a purely serial basis. That is, equipment may be used which transfers data serially directly from remote units, or utilization devices, to the data communication link.

In the overall operation of the system, the CPU computer is initially programmed in a manner that will be obvious to those skilled in the art, to control the handling of data transactions throughout the system. When so programmed, the CPU 12 cyclically or logically polls all of the remote units by transmitting each of their addresses in a predetermined sequence. As each of the remote units is polled, it is also given an instruction by the CPU, indicating what is expected of it. Thus, each remote unit accepts the data message which includes its address and decodes the instruction word accompanying it. The instructions may include, for example, a query instruction (i.e., a request of information), a send data instruction, or a receive data instruction. Each remote unit responds accordingly to the instruction word. For example, it a query instruction is sent to a remote unit, the remote unit determines whether it has any new information. If it has none, it transmits an all zero data code word. It has the appropriate new information, the remote unit transmits its address followed by the instruction word followed by the new information. The transmission then continues until all of new information is received by the CPU 12. The transmission by each remote unit of its address and the incoming instruction prior to transmission of any new information, etc., permits the CPU 12 to identify precisely what unit is communicating with it, and what type of information to expect from the unit.

Generally, the CPU computer operates substantially faster than the rate at which information is transmitted over the data communication link 24. Thus, the CPU 12 has time to carry on its computations while the data communications are in progress. Accordingly, the system is able to operate continuously without any passes, thus maintaining a very efficient use of the CPU computer. However, to maintain a check of the system's operation, it has been found desirable in some circumstances to program a brief delay into the CPU responses, so that there will be a brief pause between data transactions. This pause permits the various transaction detectors throughout the system to deactivate, thereby resetting the circuitry controlled by them.

The operation of the system thus described is substantially more efficient than known data handling systems, and permits a relatively inexpensive, small capacity computer to handle as many data transactions as a much larger and more expensive computer operating with a less efficient data communication system. Much larger computers, for example, require complicated multiplexing programs because the speed of the computer is such that it is able to handle computations much faster than the rate at which data is being fed to it. Accordingly, such computers must store not only the complicated multiplexing program, but also numerous parts of partially completed programs and data transactions. Thus, a tremendous amount of their capacity is consumed by mere "bookkeeping," or non-profitable functions. In contrast, the instant invention permits each data handling job to be completed before the next job is started. Consequently, there is no need for multiplexing programming, nor is there any need for storing partially completed data transactions. Accordingly, all of the "bookkeeping" transactions may be eliminated, enabling a much smaller and less expensive computer to handle the same number of transactions as a larger computer having a less efficient data communication system attached to it. In addition, one or more of the remote stations coupled to the system of the present invention may include a large scale data processing facility. This facility, which may be utilized on a time shared basis, may then be called upon by the system of the present invention to perform calculations or computations which are relatively lengthy in nature. Thus, the computer of the CPU may be freed from having to perform lengthy computations by the interconnection of the system with a separate data processing facility.

The data communication system of the present invention is flexible to the extent that essentially any type of data can be handled through it. Thus, data emanating from numerous separate sources, and totally unrelated in nature, may be handled conveniently and simply by the system of the present invention. Accordingly, the system is ideal for use in automating all facets of data handling within an institution. For example, the system may be installed in a hospital to handle not only the medical and analytical data associated directly with patient care, but it may also handle the accounting and billing procedures of the entire hospital. Consequently, the system may be used to aid in the diagnosis of patients' ailments, suggest that patients be given certain tests, analyze and store the results of such tests, and at the same time calculate the costs and prepare appropriate bills relating to the care of particular patients. Of course, the data communication system of the present invention is in no way limited to use in a hospital environment. It may also be used in automatic manufacturing facilities where parts may be designed by computer, manufactured, tested and subsequently redesigned, if necessary, without need for human intervention. Similarly, the system of the present invention is ideal for handling sales transactions in large merchandising institutions where item prices, inventory records, and change computations could all be handled by a CPU coupled to a network of cash registers or point of sale devices. Clearly, the system of the present invention is applicable to other uses and environments, too numerous to describe in detail.

As was pointed out hereabove, the system of the present invention is not limited to a 16 bit data word format, nor to any other particular coding formats. Accordingly, virtually any word length, and any coding scheme may be employed within the general concept of the present invention. In addition, the general concept of the invention does not require that the CPU computer be programmed in any particular manner. Thus, any suitable program may be used in the CPU, as long as the program includes a manner of permitting the CPU to control and communicate with the various remote stations coupled to the system.

Obviously, numerous additional modifications and variations of the present invention are possible in light of the above teachings. It is therefore to be understood that within the scope of the appended Claims, the invention may be practiced otherwise than as specifically described herein.

What is claimed as new and desired to be secured by Letters Patent of the United States is:

1. In a data communication system comprising a central communication processing unit and a plurality of remote stations separated from said central communication processing unit, the improvement comprising:

only a single, bidirectional, wide bandwidth communication line coupling said central communication processing unit with at least a number of said plurality of remote stations for handling all data communications originating at said central communication processing unit and directed to said remote stations, and for handling all data communications originating at said remote stations and directed to said central communications processing unit;

said remote stations being coupled to said single, bidirectional wide bandwidth communication line in daisy chain configuration, and;

said central processing unit and at least one of said remote stations including means for transmitting combined data and clock information over said single, bidirectional wide bandwidth communication line.

2. In a data communication system as in claim 1 said improvement further comprising:

an interface network for coupling said central communication processing unit to said single, bidirectional, wide bandwidth communication line.

3. In a data communication system as in claim 2, said improvement further comprising:

an output section in said interface network coupled between said central communication processing unit and said single, bidirectional, wide bandwidth communication line for transmitting signals from said central communication processing unit over said single, bidirectional, wide bandwidth communication line.

4. In a data communication system as in claim 2 said improvement further comprising:

an input section in said interface network coupled between said central communication processing unit and said single, bidirectional, wide bandwidth communication line for transmitting signals from said single, bidirectional wide bandwidth communication line to said central communication processing unit.

5. In a data communication system as in claim 1, said improvement further comprising:

input means in said central communication processing unit coupled to said single, bidirectional, wide bandwidth communication line for receiving data signals from said line, output means coupled to said single, bidirectional, wide bandwidth communication line for transmitting data signals over said line; and, control means coupled between said input means and said output means for preventing simultaneous operation of said input means and said output means.

6. In a data communication system as in claim 1, said improvement further comprising:

transaction detector means coupled to said single, bidirectional wide bandwidth communication line for preparing said central communication processing unit to receive data signals transmitted over said line.

7. In a data communication system as in claim 1, said improvement further comprising:

means for polling said plurality of remote stations in a predetermined sequence.

8. In a data communication system as in claim 1, said improvement further comprising:

all of said plurality of remote stations arranged to have simultaneous access to said single, bidirectional, wide bandwidth communication line.

9. In a data communication system as in claim 1, said improvement further comprising:

means for enabling said remote stations to communicate with said central communication processing unit over said single, bidirectional, wide bandwidth communication line on a real time basis.

10. In a data communication system as in claim 1, said improvement further comprising:

means for distinguishing each remote station of said plurality of remote stations by a characteristic address code.

11. In a data communication system as in claim 1, said improvement comprising:

remote unit means in each of said remote stations coupled to said single, bidirectional, wide bandwidth communication line for receiving and transmitting data signals over said line; and, utilization means coupled to said remote unit means.

12. In a data communication system as in claim 1, said improvement further comprising:

transaction detector means in each of said remote stations coupled to said single, bidirectional, wide bandwidth communication line for preparing said remote station to receive data signals transmitted over said line.

13. In a data communication system as in claim 1, said improvement further comprising:

storage means in each remote station for storing an address code; and, means for re-transmitting said address code with all data transmissions thus preventing interference with other remote stations coupled to said line.

14. In a data communication system as in claim 1 said improvement futher comprising:

a plurality of different types of utilization devices of at said remote stations.

15. In a data communication system as in claim 1, said improvement further comprising:

means for selectively connecting said disconnecting each of said remote stations from said single, bidirectional, wide bandwidth communication line.

16. In a data communication system as in claim 1, said improvement further comprising:

a laser beam forming at least a portion of said single, bidirectional wide bandwidth communication line.

17. In a data communication system as in claim 1, said improvement further comprising:

branching means coupled to said single, bidirection, wide bandwidth communication line.

18. In a data communication system as in claim 17, said improvement further comprising:
means included in said branching means for coupling a plurality of branches to said single, bidirectional wide bandwidth communication line.

19. In a data communication system as in claim 18, said improvement further comprising:
retransmitting logic in said branching means for maintaining communication flow in a particular direction.

20. In a data communication system in claim 1, said improvement further comprising:
means included in said single, bidirectional, wide bandwidth communication line for minimizing its external field and susceptibility to external fields from other sources.

21. In a data communication system as in claim 1, said improvement further comprising:
a length of coaxial cable forming said single, bidirectional, wide bandwidth communication line.

22. In a data communication system as in claim 1, said improvement comprising:
a hybrid line forming said single, bidirectional, wide bandwidth communication line.

23. In a data communication system as in claim 1, said improvement further comprising:
a programmable digital computer as said central communication processing unit and input-output interface means coupled between said programmable digital computer and said single, bidirectional, wide bandwidth communication line for transferring signals between said line and said computer.

24. In a data communication system as in claim 23, said improvement further comprising:
input means and output means included in said remote stations and coupled to said single, bidirectional, wide bandwidth communication line for transferring signals between said line and said remote stations; and,
storage means coupled to said input and output means for storing input and output signals.

25. In a data communication system as in claim 24, said improvement further comprising:
each of said remote stations designated by a characteristic address code, and each remote station including means for transmitting said characteristic address code with all signal transmissions.

26. In a data communication system as in claim 25, said improvement further comprising:
a plurality of different types of utilization devices in said remote stations.

27. In a data communication system as in claim 24, said improvement further comprising:
means for selectively coupling said remote stations to said single, bidirectional, wide bandwidth communication line.

28. In a data communication system comprising:
a central station and
a plurality of remote stations the improvement comprising:
only a single coaxial cable linking said central station with at least a number of said plurality of remote stations for handling all data communications originating at said central station and directed to said remote stations, and for handling all data communications originating at said remote stations and directed to said central stations, and wherein said remote stations are coupled to said coaxial cable in daisly chain configuration; and,
means for transmitting data in a self-clocking format over said single coaxial cable.

29. In a data communication system as in claim 28, said improvement further comprising:
means for identifying each of said remote stations by a particular address.

30. In a data communication system as in claim 20, said improvement further comprising:
means in each of said remote stations for transmitting said address with all data transmissions.

31. In a data communication system as in claim 28, said improvement further comprising:
branching means in said coaxial cable for interconnecting a plurality of branches of said single coaxial cable.

32. In a data communication system as in claim 31, said improvement further comprising:
retransmitting logic in said branching means for preventing simultaneous reception and transmission on any of said branches of said single coaxial cable.

33. In a data communication as in claim 28, said improvement further comprising:
transaction detector means in each of said remote stations for preparing each of said remote stations to receive signal transmissions.

34. In a data communication system as in claim 28, said improvement further comprising:
input means in each of said remote stations coupled to said coaxial cable for receiving signals from said coaxial cable; and,
output means coupled to said coaxial cable and to said input means for transmitting signals over said coaxial cable.

35. In a data communication system as in claim 34, said improvement further comprising:
storage means in each of said remote stations coupled to said input and output means for storing input and output signals; and,
means for designating each of said remote stations by a characteristic address code.

36. In a data communication system as in claim 35, said improvement further comprising:
means at each remote station for transmitting said characteristic address code with each signal transmission.

37. In a data communication system as in claim 36, said improvement further comprising:
a programmable digital computer in said central station,
input interface means coupling said programmable digital computer with said coaxial cable for receiving signals from said coaxial cable and applying said signals to said programmable digital computer; and,
output interface means coupling said programmable digital computer with said coaxial cable for transmitting signals from said programmable digital computer over said coaxial cable.

38. In a data communication system as in claim 37, said improvement further comprising:
means in said central station coupling said input interface means with said output interface means for preventing simultaneous transmission and reception of signals by said programmable digital computer.

39. In a data communication system as in claim 28, id improvement further comprising:

means for coupling each of said remote stations to said single coaxial cable in a bridging mode.

40. In a data communication system as in claim 28, id improvement further comprising:

means for selectively connecting each of said plurality of remote stations to and disconnecting them from said single coaxial cable.

41. In a data communication system as in claim 28, id improvement further comprising:

a plurality of different types of utilization devices at said plurality of remote stations.

42. A data communication system comprising:

a central communication processing unit, a plurality of remote stations coupled to said central communication processing unit for exchanging data communication therewith, a single, bidirectional, wide bandwidth communication line providing the only coupling between said central communication processing unit and said plurality of remote stations for handling all signals exchanges between said remote stations and said central processing unit; and, transmitting means included in said central processing unit and in at least one of said remote units for transmitting combined data and clock signals over said communication line.

43. In a communication system for handling data transactions of arbitrary length between a central processing unit and a plurality of remote stations, the improvement comprising:

transmitting means included in said central processing unit and in at least one of said remote stations for transmitting combined data and clock signals, receiving means included in said central processing unit and in at least one of said remote stations for receiving said combined data and clock signals, said receiving means including means for operating said clock and data signals whereby data and synchronizing signals are applied to said central processing unit and to said remote stations; and, a single, bidirectional wide bandwidth communication line coupling said transmitting and receiving means and providing the only communication link therebetween.

* * * * *